US012461312B2

(12) United States Patent
Sporer et al.

(10) Patent No.: US 12,461,312 B2
(45) Date of Patent: Nov. 4, 2025

(54) CLADDING STRUCTURE IN THE BACK END OF LINE OF PHOTONICS CHIPS

(71) Applicant: GlobalFoundries U.S. Inc., Malta, NY (US)

(72) Inventors: Ryan Sporer, Mechanicville, NY (US); Karen Nummy, Newburgh, NY (US); Keith Donegan, Saratoga Springs, NY (US); Thomas Houghton, Marlboro, NY (US); Yusheng Bian, Ballston Lake, NY (US); Takako Hirokawa, Ballston Lake, NY (US); Kenneth Giewont, Hopewell Junction, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 177 days.

(21) Appl. No.: 17/805,686

(22) Filed: Jun. 6, 2022

(65) Prior Publication Data
US 2023/0393340 A1 Dec. 7, 2023

(51) Int. Cl.
*G02B 6/30* (2006.01)
*G02B 6/12* (2006.01)
*G02B 6/132* (2006.01)

(52) U.S. Cl.
CPC ............... *G02B 6/30* (2013.01); *G02B 6/12* (2013.01); *G02B 6/132* (2013.01)

(58) Field of Classification Search
CPC ......... G02B 6/30; G02B 6/132; G02B 6/2861
See application file for complete search history.

(56) References Cited

U.S. PATENT DOCUMENTS

| 5,291,575 A | 3/1994 | Yanagawa et al. |
| 6,316,281 B1 | 11/2001 | Lee et al. |
| 7,831,123 B2 | 11/2010 | Sparacin et al. |
| 10,191,215 B2 | 1/2019 | Kippenberg et al. |

(Continued)

OTHER PUBLICATIONS

Snyder et al., Ultra-Broadband, Polarization-Insensitive SMF-28 Fiber Edge Couplers for Silicon Photonics, 2017 IEEE CPMT Symposium Japan (ICSJ), 2017, pp. 55-58, IEEE.

(Continued)

*Primary Examiner* — Thomas A Hollweg
*Assistant Examiner* — Kirsten D. Endresen
(74) *Attorney, Agent, or Firm* — David Cain

(57) ABSTRACT

IC chips for photonics applications are disclosed. An example IC chip includes a substrate, an optical component above the substrate, and a first connection level above the substrate. The first connection level includes the optical component and a first cladding structure, in which the optical component is covered by the first cladding structure. The IC chip also includes a second connection level on the first connection level. The second connection level includes a first interlayer dielectric material. The IC chip further includes a second cladding structure directly above the optical component. The second cladding structure has at least a section within the second connection level. The second cladding structure is on the first cladding structure. The second cladding structure is laterally adjacent to and in direct contact with the first interlayer dielectric material. The second cladding structure includes a material different from the first interlayer dielectric material.

17 Claims, 16 Drawing Sheets

(56) References Cited

U.S. PATENT DOCUMENTS

| | | | |
|---|---|---|---|
| 2003/0003736 A1* | 1/2003 | Delwala | G02B 6/12007 438/689 |
| 2007/0092193 A1 | 4/2007 | Yokino et al. | |
| 2012/0251034 A1* | 10/2012 | Chen | G02B 6/12004 438/31 |
| 2015/0014812 A1 | 1/2015 | Lan et al. | |
| 2019/0154919 A1 | 5/2019 | Teng et al. | |
| 2021/0091056 A1* | 3/2021 | Yu | H10F 77/93 |
| 2021/0405298 A1* | 12/2021 | Lin | G02B 6/1228 |
| 2023/0161120 A1* | 5/2023 | Yu | G02B 6/4214 385/14 |

OTHER PUBLICATIONS

JV Galan et al., CMOS compatible silicon etched V-grooves integrated with a SOI fiber coupling technique for enhancing fiber-to-chip alignment, 2009 6th IEEE International Conference on Group IV Photonics, 2009, pp. 148-150, IEEE.

Giewont et al., 300-mm Monolithic Silicon Photonics Foundry Technology, IEEE Journal of Selected Topics in Quantum Electronics, 2019, pp. 1-11, vol. 25, No. 5, IEEE.

Bian et al., Towards low-loss monolithic silicon and nitride photonic building blocks in state-of-the-art 300mm CMOS foundry, Frontiers in Optics 2020, 2020, pp. 1-2, OSA.

Peng et al., A CMOS Compatible Monolithic Fiber Attach Solution with Reliable Performance and Self-alignment, 2020 Optical Fiber Communications Conference and Exhibition (OFC), Mar. 2020, pp. 1-3, IEEE.

Bian et al., 3D Integrated Laser Attach Technology on 300-mm Monolithic Silicon Photonics Platform, 2020 IEEE Photonics Conference (IPC), 2020, pp. 1-2, IEEE.

European Patent Office, European Search Report and Opinion issued in European Patent Application No. 222204103.0 on May 24, 2023; 6 pages.

* cited by examiner

CLADDING STRUCTURE IN THE BACK END OF LINE OF PHOTONICS CHIPS

FIELD OF THE INVENTION

The disclosed subject matter relates generally to integrated circuit chips and semiconductor products for photonics applications. More particularly, the present disclosure relates to a cladding structure in the back end of the line of a monolithic photonics chip.

BACKGROUND

Silicon photonics is a platform for potentially revolutionary advances in the fields of telecommunications, data communications, medical technology, security, quantum computing, and sensing. Silicon photonics has the potential to realize small, highly integrated, photonics sub-systems that leverage off the decades of silicon fabrication experience, technology, and scalability to gain access to the full potential of the silicon platform, i.e. silicon photonics for high-speed signaling and sensing, and complementary metal-oxide semiconductor (CMOS) electronics for subsequent logical operations and computations. Such multi-chip integration also allows for the bridging of different functional technologies, such as micro-electro-mechanical systems (MEMS), III-V materials, non-CMOS application-specific integrated circuits (ASIC), etc.

Fiber optics communications have gained prominence in telecommunications, instrumentation, cable TV, network, and data transmission and distribution. The development of small, efficient optical transmission lines, such as optical fibers, has led to widespread use of optical communication in many applications requiring, long distance and/or high data rate communication (e.g, telecommunications). Fiber optic transmission lines provide low cost, compact, low electromagnetic interference, and high-speed data transmission over significant distances.

A need for greater bandwidth in fiber optic network links is widely recognized. The volume of data transmissions has seen a dramatic increase in the last decade. This trend is expected to grow exponentially in the near future. As a result, there exists a need for deploying an infrastructure capable of handling this increased volume and for improvements in system performance.

SUMMARY

In an aspect of the present disclosure, there is provided an IC chip including a substrate, an optical component above the substrate, and a first connection level above the substrate. The first connection level includes the optical component and a first cladding structure, in which the optical component is covered by the first cladding structure. The IC chip also includes a second connection level on the first connection level, a third connection level on the second connection level, and a fourth connection level on the third connection level. The third connection level and the fourth connection level include an interlayer dielectric material. The IC chip further includes a second cladding structure directly above the optical component. The second cladding structure has at least a section within the second connection level. The second cladding structure is on the first cladding structure. The second cladding structure includes a material different from the interlayer dielectric material in the third and the fourth connection levels.

In another aspect of the present disclosure, there is provided an integrated circuit (IC) chip including a substrate, an optical component above the substrate, and a first connection level above the substrate. The first connection level includes the optical component and a first cladding structure, in which the optical component is covered by the first cladding structure. The IC chip also includes a second connection level on the first connection level. The second connection level includes a first interlayer dielectric material. The IC chip further includes a second cladding structure directly above the optical component. The second cladding structure has at least a section within the second connection level. The second cladding structure is on the first cladding structure. The second cladding structure is laterally adjacent to and in direct contact with the first interlayer dielectric material. The second cladding structure includes a material different from the first interlayer dielectric material.

BRIEF DESCRIPTION OF THE DRAWINGS

The present disclosure may be understood by reference to the following description taken in conjunction with the accompanying drawings.

For simplicity and clarity of illustration, the drawings illustrate the general manner of construction, and certain descriptions and details of features and techniques may be omitted to avoid unnecessarily obscuring the discussion of the described embodiments of the present disclosure. Additionally, elements in the drawings are not necessarily drawn to scale. For example, the dimensions of some of the elements in the drawings may be exaggerated relative to other elements to help improve understanding of embodiments of the present disclosure. The same reference numerals in different drawings denote the same elements, while similar reference numerals may, but do not necessarily, denote similar elements.

DETAILED DESCRIPTION

Various illustrative embodiments of the present disclosure are described below. The embodiments disclosed herein are exemplary and not intended to be exhaustive or limiting to the present disclosure.

Figure 1:
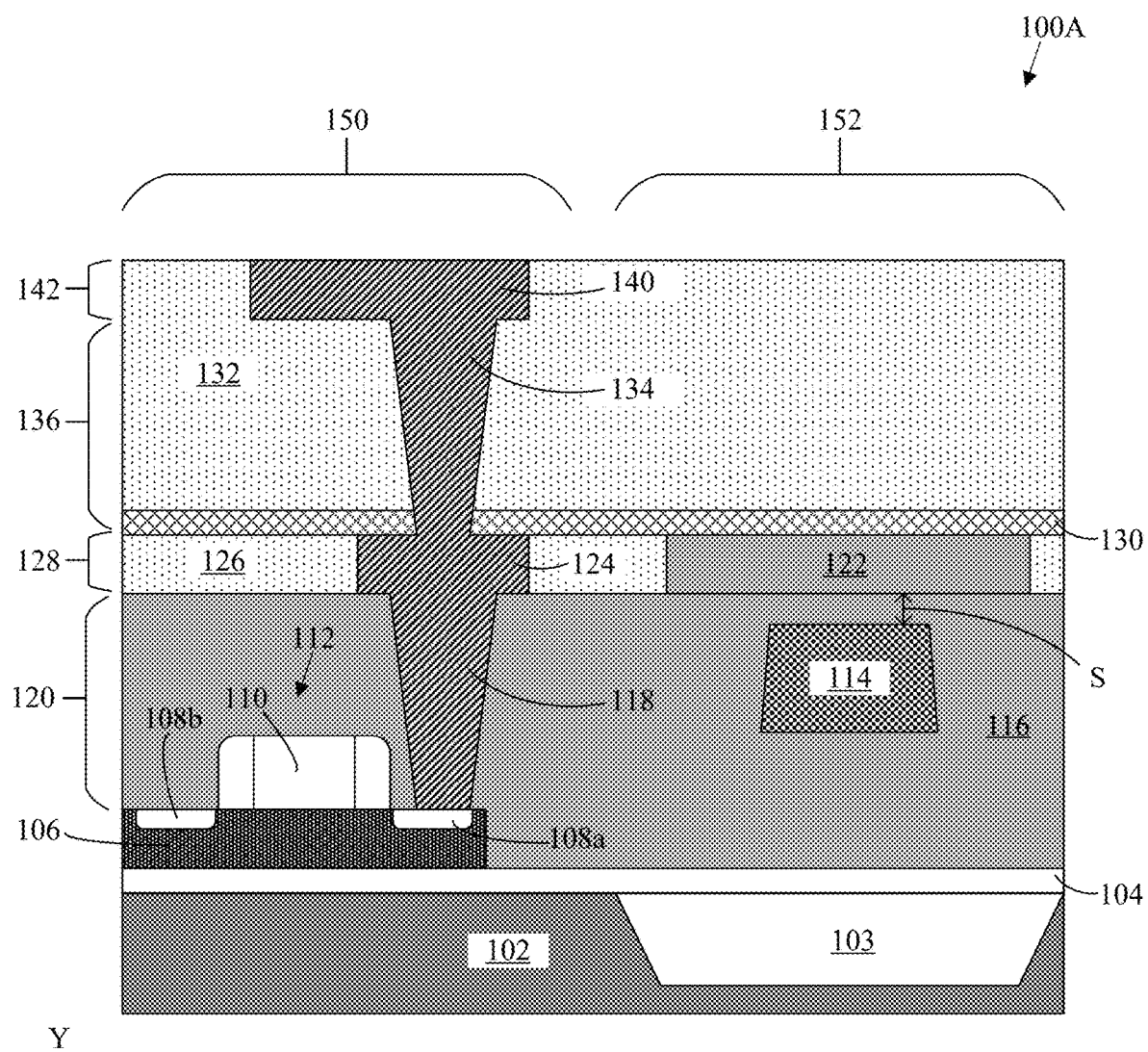
FIG. 1 is a cross-sectional view of an exemplary IC chip.
Figure 2:
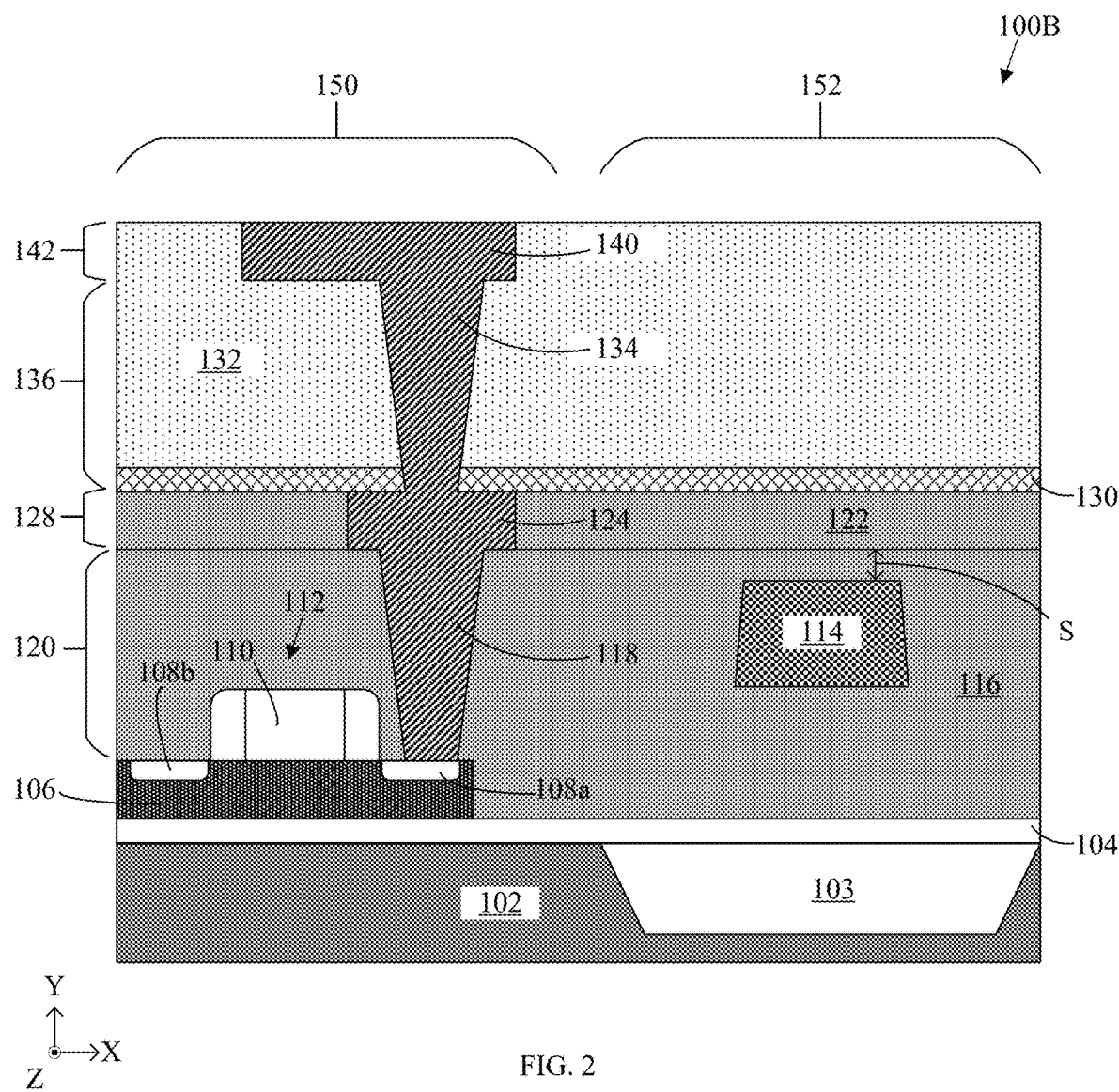
FIG. 2 is a cross-sectional view of another exemplary IC chip.
Figure 3:
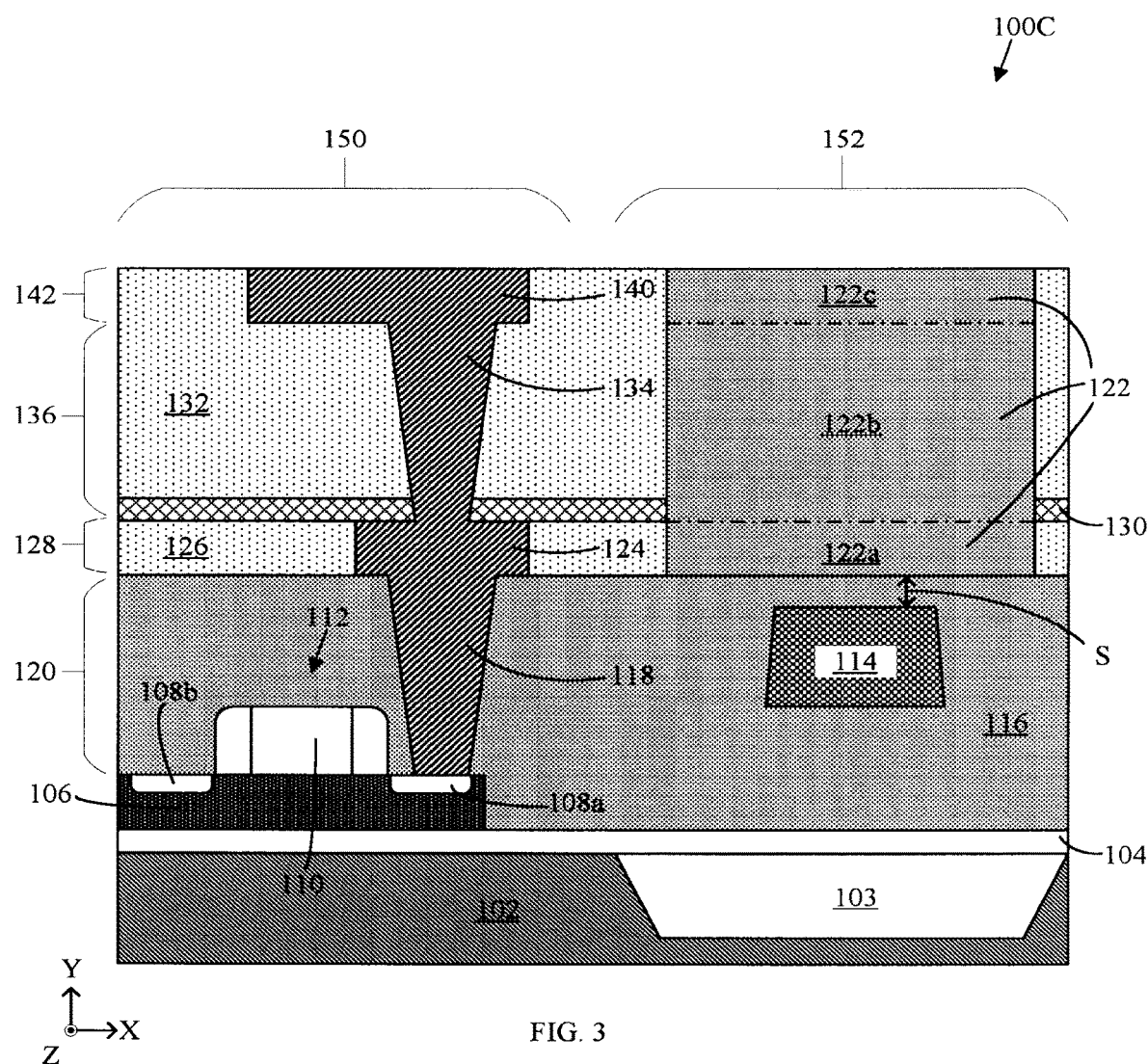
FIG. 3 is a cross-sectional view of yet another exemplary IC chip.

Referring to FIG. 1, FIG. 2, and FIG. 3, exemplary IC chips 100A, 100B, 100C for photonics applications are depicted. The IC chips 100A, 100B, 100C may include a substrate 102, a first connection level 120 above the substrate 102, a second connection level 128 on the first connection level, a third connection level 136 on the second connection level 128, and a fourth connection level 142 on the third connection level 136. The connection levels 120, 128, 136, 142 may include various back end of line (BEOL) structures, such as interlayer dielectric materials, dielectric liners, and interconnect features. Examples of the interconnect features may include interconnect vias, conductive lines, and contact structures. The interconnect features in the connection levels 120, 128, 136, 142 may enable connections between various devices or components within the chip to perform desired functions.

The connection levels 120, 128, 136, 142 may be referred to as "inter-level dielectric (ILD) regions" and may be formed by BEOL processing activities. The IC chips 100A, 100B, 100C may include a plurality of connection levels. Although the IC chips 100A, 100B, 100C shown in FIG. 1, FIG. 2, and FIG. 3 depict four connection levels 120, 128, 136, 142, the IC chips 100A, 100B, 100C may include additional connection levels formed over connection level 142. The number of connection levels in the IC chips 100A, 100B, 100C may depend on, for example, design requirements or the process involved. In some implementations, the first connection level 120 and the third connection level 136 may include interconnect vias and contact structures and may be referred to as "via levels". The second connection level 128 and the fourth connection level 142 may include conductive lines and may be referred to as "metal levels". In some implementations, the second connection level 128 may be referred to as an "M1 level" and the fourth connection level 142 may be referred to as an "M2 level".

The IC chips 100A, 100B, 100C may be monolithic IC chips. The term "monolithic IC chips" may refer to chips built on a single substrate or a single semiconductor base material. The IC chips 100A, 100B, 100C may be referred to as "photonics integrated circuit (PIC) chips", in which the PIC chips may integrate optical components and electronic components into a unified or a monolithic platform. For example, the IC chips 100A, 100B, 100C may include a photonics region 152 above the substrate 102 and a logic region 150 above the substrate 102. The photonics region 152 may include various optical components, such as waveguides, couplers, photodetectors, modulators, lasers, etc. The optical components may perform at least the functions of light coupling, light propagation, light absorption, and conversion of light to an electrical current. The logic region 150 may include various electronic components or front end of line (FEOL) structures. The FEOL structures may be formed on an active layer or directly on the substrate and may not be formed in the photonics region 152.

The interconnect features in the BEOL (e.g., conductive lines, interconnect vias, contact structures) may be formed in the logic region 150. The photonics region 152 may be substantially free of interconnect features similar to those formed in the logic region 150. However, the interlayer dielectric materials and dielectric liners in the BEOL that were formed in the logic region 150 may also be formed in the photonics region 152.

In the examples shown in FIG. 1, FIG. 2, and FIG. 3, an optical component 114 is positioned above the substrate 102. The optical component 114 may be positioned within the photonics region 152. In some embodiments, the optical component 114 may be a waveguide. The waveguide 114 may be made of either a semiconductor material or a dielectric material. Examples of the semiconductor material in the waveguide may include, but are not limited to, III-V compound semiconductors, amorphous silicon, polycrystalline silicon, amorphous germanium, polycrystalline germanium, amorphous SiGe, or polycrystalline SiGe. Examples of the dielectric material in the waveguide may include, but are not limited to, silicon nitride (SiN), silicon oxynitride (SiON), aluminum nitride (AlN), or other nitride-containing compounds. Preferably, the waveguide 114 may include silicon nitride.

A transistor 112 may be formed above the substrate 102. The transistor 112 may be positioned within the logic region 150. The transistor 112 illustrated in the accompanying drawings may be a planar field-effect transistor, although other examples of transistors may be used. The other examples of transistors may include, but are not limited to, fin-shaped field-effect transistor (FinFET), ferroelectric field-effect transistors (FeFET), and bi-polar junction transistor (BJT). An active layer 106 may be formed above the substrate 102. The active layer 106 may be a semiconductor layer, such as silicon or germanium. The transistor 112 may include a gate 110, in which the gate 110 may be positioned on the active layer 106. The transistor may also include source or drain regions 108a, 108b, in which the gate 110 may be positioned between the source or drain regions 108a, 108b. The source or drain regions 108a, 108b may be formed in the active layer 106, or formed as raised regions on an upper surface of the active layer 106. The active layer 106 may be formed above the substrate 102.

The transistor 112 and the optical component 114 may be positioned in the first connection level 120. The optical component 114 may be positioned at a higher elevation than the transistor 112. In particular, the optical component 114 may be positioned above the gate 110, and the gate 110 may be positioned in the first connection level 120. In some embodiments, a buried insulator layer 104 may be formed between the substrate 102 and the active layer 106. The buried insulator layer 104 may be positioned on or directly on the substrate 102 and the active layer 106 may be positioned on or directly on the buried insulator layer 104. Alternatively, in other embodiments (not shown), the active layer 106 may be formed as a region in the substrate 102. In some embodiments, a cavity 103 may be defined in the substrate 102, in which the cavity 103 may be positioned below the buried insulator layer 104. The cavity 103 may be positioned within the photonics region 152 and may not be present in the logic region 150.

The first connection level 120 may extend across the photonics region 152 and the logic region 150. The first connection level 120 may include the optical component 114 and a first cladding structure 116. The optical component 114 is covered by the first cladding structure 116. The first cladding structure 116 may be positioned over the buried insulator layer 104. In an embodiment, the optical component 114 may have at least its upper surface and side surfaces covered by the first cladding structure 116. In another embodiment, the optical component 114 may be encompassed within the first cladding structure 116 such that all surfaces of the optical component 114 may be completely covered by the first cladding structure 116. The first cladding structure 116 may have an upper surface. The upper surface of the optical component 114 may be spaced apart from the upper surface of the first cladding structure 116 by a spacing S. The spacing S may have a value between about 1 nm to about 25 nm.

In the examples shown in FIG. 1, FIG. 2, and FIG. 3, the first cladding structure 116 may extend across from the photonics region 152 to the logic region 150. The first cladding structure 116 may be positioned over the transistor 112 and the active layer 106. The first connection level 120 may further include a contact structure 118 positioned in the logic region 150. The contact structure 118 may be formed on the source or drain region 108a. The contact structure 118 may be formed in the first cladding structure 116. In other examples (not shown), the first cladding structure 116 may be positioned in the photonics region 152 and does not extend into the logic region 150. Instead of having the first cladding structure 116 be positioned over the transistor 112 and the active layer 106, an insulating material different from the first cladding structure 116 may be positioned over the transistor 112 and the active layer 106.

The first cladding structure 116 may function as an interlayer dielectric (ILD) to provide electrical isolation of the transistor 112 and the contact structure 118. The first cladding structure 116 may be structured as a single layer or multiple layers. In embodiments where the optical component 114 is a waveguide, the first cladding structure 116 may serve to prevent loss of light from the waveguide and increase confinement of light within the waveguide. The first cladding structure 116 may include oxides of silicon, such as silicon oxide, tetraethyl orthosilicate (TEOS), undoped silicon glass (USG), high density plasma (HDP) silicon oxide, high aspect ratio process (HARP) oxide, tonen silazane (TOSZ) oxide, or flowable chemical vapor deposition (FCVD) oxide.

The second connection level 128 may include a conductive line 124 and a first interlayer dielectric material 126. The conductive line 124 in the second connection level 128 may be disposed on the contact structure 118 in the first connection level 120 to provide routing of electrical signals between the second connection level 128 and the first connection level 120. The conductive line 124 may be integrally formed with the contact structure 118.

The third connection level 136 may include an interconnect via 134. The fourth connection level 142 may include a conductive line 140. The interconnect via 134 in the third connection level 136 may be disposed over the conductive line 124 in the second connection level 128 to provide routing of electrical signals between the second connection level 128 and the third connection level 136. The conductive line 140 in the fourth connection level 142 may be disposed on the interconnect via 134 in the third connection level 136 to provide routing of electrical signals between the second connection level 128 and the third connection level 136. The conductive line 140 may be integrally formed with the interconnect via 134.

A second interlayer dielectric material 132 may be positioned in the third connection level 136 and the fourth connection level 142. The conductive line 140 in the fourth connection level 142 and the interconnect via 134 in the third connection level 136 may be formed in the second interlayer dielectric material 132. The third connection level 136 may also include a dielectric liner 130 disposed on the second connection level 128. The dielectric liner 130 may serve as an etch stop layer. The second interlayer dielectric material 132 may be disposed on the dielectric liner 130.

As shown in FIG. 1, FIG. 2, and FIG. 3, the conductive line 124 in the second connection level 128, the interconnect via 134 in the third connection level 136, and the conductive line 140 in the fourth connection level 142 may be positioned in the logic region 150 and may not be positioned in the photonics region 152. The second interlayer dielectric material 132 and the dielectric liner 130 may extend across the logic region 150 and the photonics region 152.

The IC chips 100A, 100B, 100C also include a second cladding structure 122 directly above the optical component 114. For example, the second cladding structure 122 may be directly above the optical component 114 by being positioned vertically above and covering an upper surface of the optical component 114. The second cladding structure 122 may be positioned on or directly on the first cladding structure 116.

The second cladding structure 122 has at least a section that is positioned within the second connection level 128. In the examples shown in FIG. 1 and FIG. 2, the second cladding structure 122 may be positioned within the second connection level 128. The second cladding structure 122 may have an upper surface and the second connection level 128 may have an upper surface. The second cladding structure 122 may be entirely positioned within the second connection level 128 such that the upper surface of the second cladding structure 122 may be substantially coplanar with the upper surface of the second connection level 128.

In the example shown in FIG. 3, the second cladding structure 122 may extend vertically from the second connection level 128, through the third connection level 136, and terminate in the fourth connection level 142. The second cladding structure 122 may have an upper surface and the fourth connection level 142 may have an upper surface. The second cladding structure 122 may terminate in the fourth connection level 142 such that the upper surface of the second cladding structure 122 may be substantially coplanar with the upper surface of the fourth connection level 142. The second cladding structure 122 may have a first section 122a in the second connection level 128, a second section 122b in the third connection level 136, and a third section 122c in the fourth connection level 142. The third section 122c of the second cladding structure 122 may have an upper surface, and the upper surface of the second cladding structure 122 may be substantially coplanar with the upper surface of the fourth connection level 142. In some embodiments, the first section 122a may be a lower section of the second cladding structure 122, the second section 122b may be a middle section of the second cladding structure 122, and the third section 122c may be an upper section of the second cladding structure 122.

In the example shown in FIG. 1, the second cladding structure 122 may be positioned in the photonics region 152 only and may not extend into the logic region 150. The first interlayer dielectric material 126 in the second connection level 128 may extend across the photonics region 152 and the logic region 150. In the photonics region 152 of the IC chip 100A, the second cladding structure 122 is laterally adjacent to and in direct contact with the first interlayer dielectric material 126. In the logic region 150 of the IC chip 100A, the conductive line 124 may be formed in the first interlayer dielectric material 126.

In the example shown in FIG. 2, the second cladding structure 122 may extend across the photonics region 152 and the logic region 150. The second cladding structure 122 may replace the first interlayer dielectric material 126 in the second connection level 128. Accordingly, the first interlayer dielectric material 126 may not be present in the logic region 150 and photonics region 152. In the logic region of the IC chip 100B, the conductive line 124 may be formed in the second cladding structure 122.

In the example shown in FIG. 3, the second cladding structure 122 may be positioned in the photonics region 152 and may not extend into the logic region 150. The first interlayer dielectric material 126 in the second connection level 128 and the second interlayer dielectric material 132 in the third connection level 136 and the fourth connection level 142 may extend across the photonics region 152 and the logic region 150. In the photonics region 152 of the IC chip 100A, the second cladding structure 122 is laterally adjacent to and in direct contact with the first interlayer dielectric material 126 and the second interlayer dielectric material 132. For example, the first section 122a of the second cladding structure 122 is laterally adjacent to and in direct contact with the first interlayer dielectric material 126, the second section 122b and the third section 122c of the second cladding structure 122 are laterally adjacent to and in direct contact with the second interlayer dielectric material 132. In the logic region 150 of the IC chip 100A, the conductive line 124 may be formed in the first interlayer dielectric material 126, the interconnect via 134 and the conductive line 140 may be formed in the second interlayer dielectric material 132.

The first interlayer dielectric material 126 and the second interlayer dielectric material 132 may be a low-k dielectric material having a dielectric constant in the range of about 1 to about 3. Examples of the low-k dielectric material may include, but are not limited to, SiCOH, carbon-doped silicon oxides, or organosilicate glass (OSG). The second cladding structure 122 includes a material different from the first interlayer dielectric material 126 and the second interlayer dielectric material 132.

The second cladding structure 122 may include a dielectric material having a refractive index that matches the refractive index of the dielectric material in the first cladding structure 116. The second cladding structure 122 may include oxides of silicon, such as silicon oxide, tetraethyl orthosilicate (TEOS), undoped silicon glass (USG), high density plasma (HDP) silicon oxide, high aspect ratio process (HARP) oxide, tonen silazane (TOSZ) oxide, or flowable chemical vapor deposition (FCVD) oxide. In an embodiment, the first cladding structure 116 may include USG, the second cladding structure 122 may include TEOS, and the interlayer dielectric materials 126, 132 may include SiCOH. In the examples shown in FIG. 1 and FIG. 2, the second cladding structure 122 may have a thickness in the range of about 100 nm to about 500 nm. In the example shown in FIG. 3, the second cladding structure 122 may have a thickness in the range of about 100 nm to about 2000 nm. The term "thickness" refers to the distance between the upper and the lower surfaces of the second cladding structure 122.

The dielectric liner 130 may include, but are not limited to, silicon oxynitride (SiON), silicon nitride (SiN), Nitrogen doped silicon carbide (SiCN), $SiC_xH_y$ (i.e., BLoK™), or $SiN_wC_xH_z$ (i.e., NBLoK™), wherein each of w, x, y, and z independently has a value greater than 0 and less than 0.75. The dielectric liner 130 may be of a different material from the cladding structures 116, 122 and the interlayer dielectric materials 126, 132.

The substrate 102 may be made of any semiconductor material, such as silicon, germanium, silicon germanium (SiGe), silicon carbide, and those consisting essentially of III-V compound semiconductors, such as GaAs, II-VI compound semiconductors such as ZnSe. The substrate 102 may have an amorphous, polycrystalline, or monocrystalline structure. The buried insulator layer 104 may include an oxide (e.g., silicon dioxide, germanium dioxide, etc.) or a nitride (e.g., silicon nitride, germanium nitride, etc.).

The interconnect via 134, the contact structure 118, and the conductive lines 124, 140 may include a metal, such as tantalum (Ta), tungsten (W), ruthenium (Ru), cobalt (Co), copper (Cu), titanium (Ti), nickel (Ni), platinum (Pt), aluminum (Al), or an alloy thereof. Other suitable types of metal, alloys, or conductive materials may also be useful. The interconnect via 134, the contact structure 118, and the conductive lines 124, 140 may be formed using a damascene process (e.g., a single damascene or a dual damascene).

Figure 4:
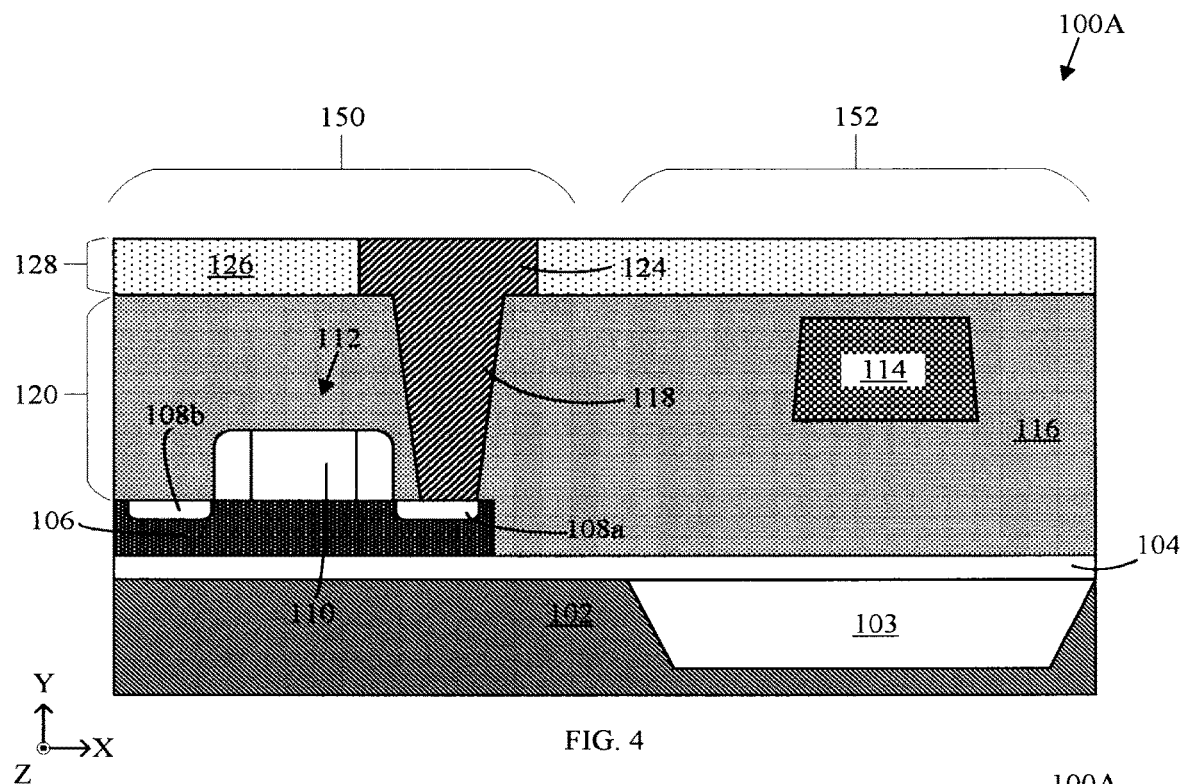
FIG. 4 through FIG. 6 are cross-sectional views depicting a set of steps for fabricating the exemplary IC chip shown in FIG. 1.
Figure 5:
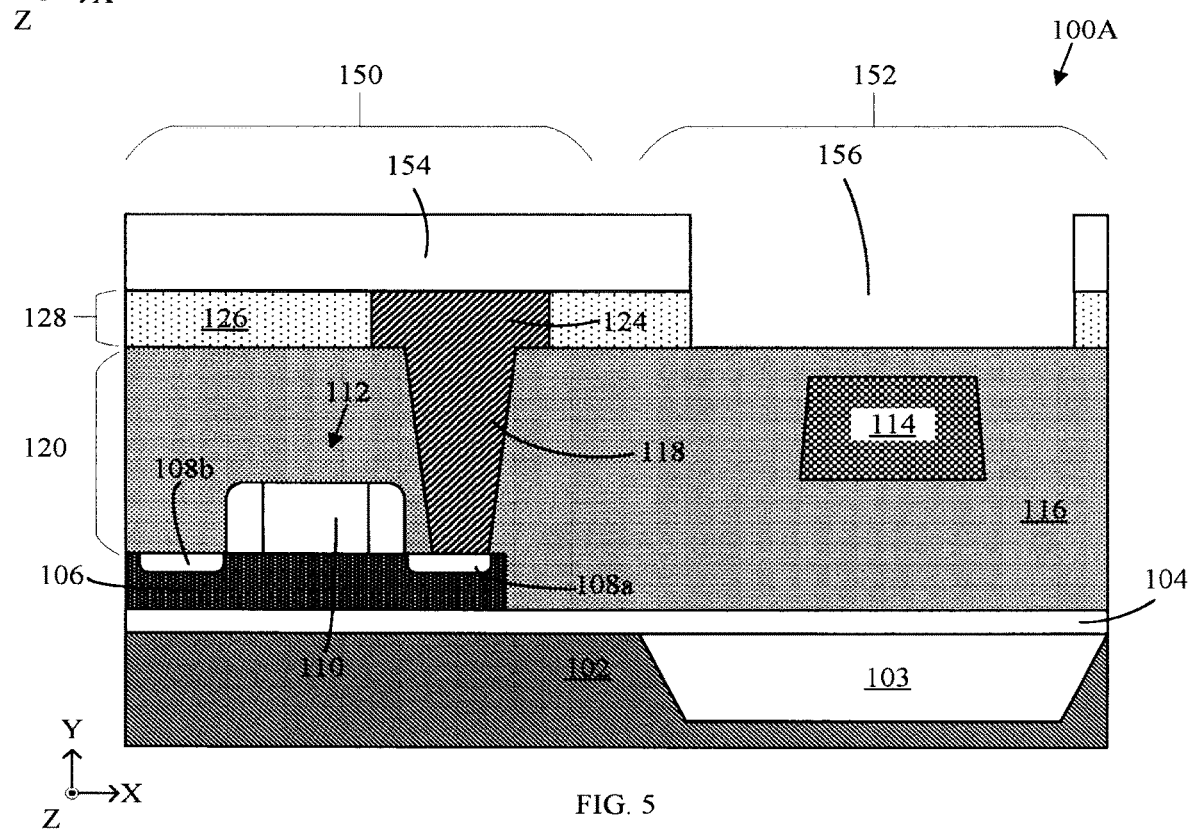
Figure 6:
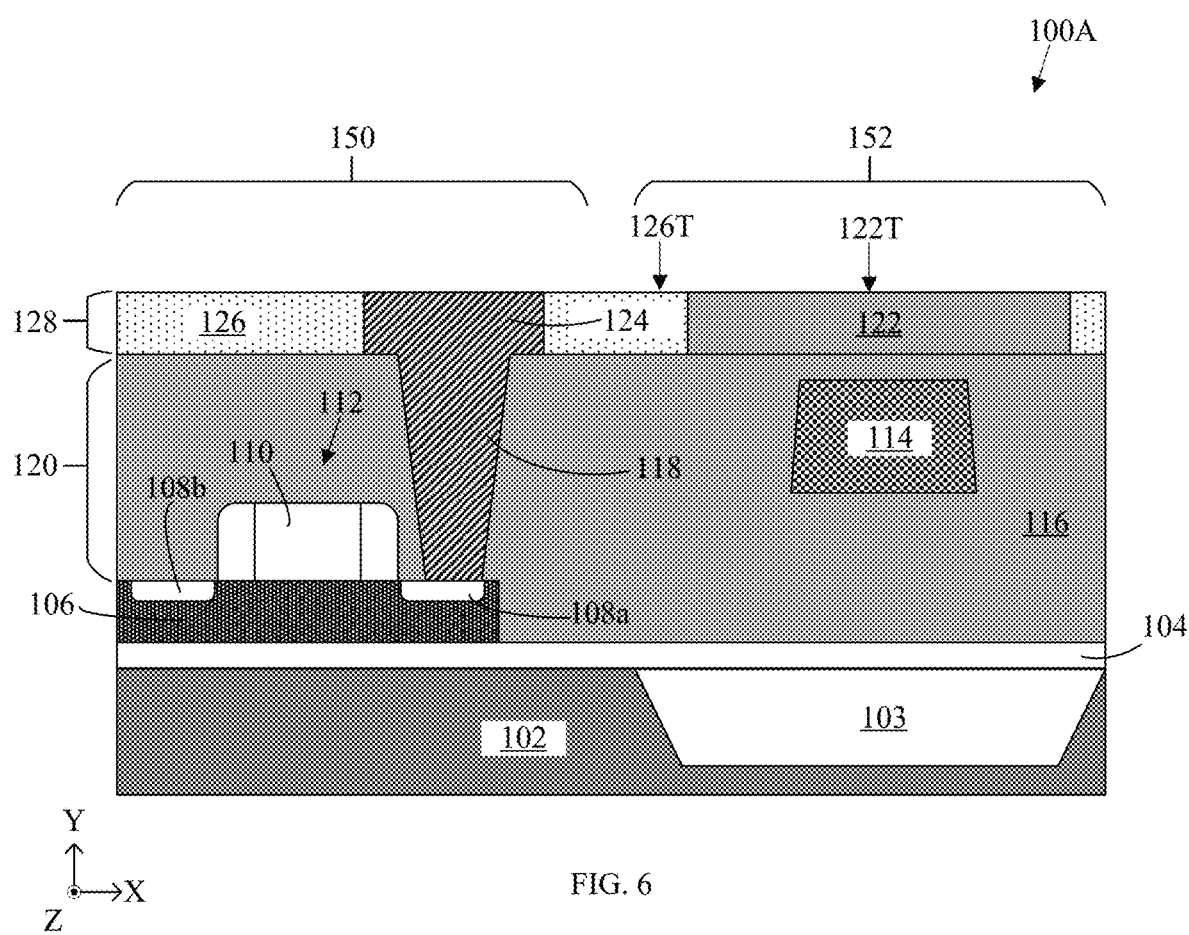

FIGS. 4, 5, and 6 show a set of steps that may be used to create the example IC chip 100A in FIG. 1.

As used herein, "deposition techniques" refer to the process of applying a material over another material (or the substrate). Exemplary techniques for deposition include, but are not limited to, spin-on coating, sputtering, chemical vapor deposition (CVD), physical vapor deposition (PVD), molecular beam deposition (MBD), pulsed laser deposition (PLD), liquid source misted chemical deposition (LSMCD), atomic layer deposition (ALD).

Additionally, "patterning techniques" include deposition of material or photoresist, patterning, exposure, development, etching, cleaning, and/or removal of the material or photoresist as required in forming a described pattern, structure, or opening. Examples of techniques for patterning include, but are not limited to, wet etch lithographic processes, dry etch lithographic processes, or direct patterning processes. Such techniques may use mask sets and mask layers.

Referring to FIG. 4, a structure for the fabrication of an IC chip may include a substrate 102. A buried insulator layer 104 may be formed on a substrate 102 and an active layer 106 may be formed on the buried insulator layer 104. The structure may have a logic region 150 and a photonics region 152. A transistor 112 may be formed on the active layer 106, in which the transistor 112 may be formed in the logic region 150. A first cladding structure 116 may be formed over the transistor 112, the active layer 106, and the buried insulator layer 104. Formation of the first cladding structure 116 may include the deposition of one or more layers of material. An optical component 114 may be formed above the substrate 102 and the buried insulator layer 104, in which the optical component 114 may be formed in the photonics region 152. The optical component 114 may be formed in the first cladding structure 116 such that the optical component 114 is covered by the first cladding structure 116. For example, during the deposition of material layers to form the first cladding structure 116, the optical component 114 may be formed on one of the material layers deposited to form the first cladding structure 116, followed by further deposition of material layers to cover the optical component 114, thereby forming the optical component 114 within the first cladding structure 116.

A first interlayer dielectric material 126 may be formed on the first cladding structure 116, for example, using the deposition techniques described herein. In the logic region 150, a contact structure 118 may be formed in the first cladding structure 116, and a conductive line 124 may be formed in the first interlayer dielectric material 126. The conductive line 124 may be formed over the contact structure 118. Formation of the contact structure 118 and the conductive line 124 may include the use of a damascene process. For example, the first interlayer dielectric material 126 and the first cladding structure 116 may be patterned using the patterning techniques described herein to form an opening (not shown), followed by depositing, or sputtering of a metal in the opening to form the contact structure 118 and the conductive line 124. The structure may include a first connection level 120 and a second connection level 128. The second connection level 128 may be positioned on the first connection level 120. The first connection level 120 may be defined by the positioning of the contact structure 118 and the second connection level 128 may be defined by the positioning of the conductive line 124.

Referring to FIG. 5, a patterned mask layer 154 may be formed on the first interlayer dielectric material 126. The patterned mask layer 154 may mask sections of the first interlayer dielectric material 126 in the logic region 150 while sections of the first interlayer dielectric material 126 in the photonics region 152 may be unmasked or exposed. The unmasked or exposed sections of the first interlayer dielectric material 126 in the photonics region 152 may be patterned using the patterning techniques described herein. An opening 156 may be formed in the first interlayer dielectric material 126 and exposes the first cladding structure 116. The opening 156 may be positioned in the photonics region 152. The patterned mask layer 154 may be removed after the patterning step.

Referring to FIG. 6, a second cladding structure 122 may be formed in the opening 156. The formation of the second cladding structure 122 may include the deposition of an oxide of silicon, followed by a chemical mechanical planarization of the deposited material. The resulting second cladding structure 122 may have an upper surface 122T. The upper surface 122T of the second cladding structure 122 may be substantially coplanar with an upper surface of the first interlayer dielectric material 126T.

To form the example shown in FIG. 1, the structure in FIG. 6 may be subjected to further processing. For example, a dielectric liner 130 may be formed on or directly on the first interlayer dielectric material 126, the conductive line 124, and the second cladding structure 122, using the deposition techniques described herein. A second interlayer dielectric material 132 may be formed on or directly on the dielectric liner 130, using the deposition techniques described herein. In the logic region 150, an interconnect via 134 and a conductive line 140 may be formed in the second interlayer dielectric material 132. The conductive line 140 may be formed on or directly on the interconnect via 134. The interconnect via 134 may be formed over the conductive line 124. The structure may further include a third connection level 136 and a fourth connection level 142. The third connection level 136 may be defined by the positioning of the interconnect via 134 and the fourth connection level 142 may be defined by the positioning of the conductive line 140. The third connection level 136 may be positioned on the second connection level 128 and the fourth connection level 142 may be positioned on the third connection level 136.

Formation of the interconnect via 134 and the conductive line 140 may include the use of a damascene process. For example, the second interlayer dielectric material 132 may be patterned using the patterning techniques described herein to form an opening (not shown), followed by depositing or sputtering of a metal in the opening to form the interconnect via 134 and the conductive line 140. The formation of the opening for which the metal is to be formed in may include an etch process. The dielectric liner 130 may serve as an etch stop layer during the etch process to prevent over etch into the underlying conductive line 124.

Figure 7A:
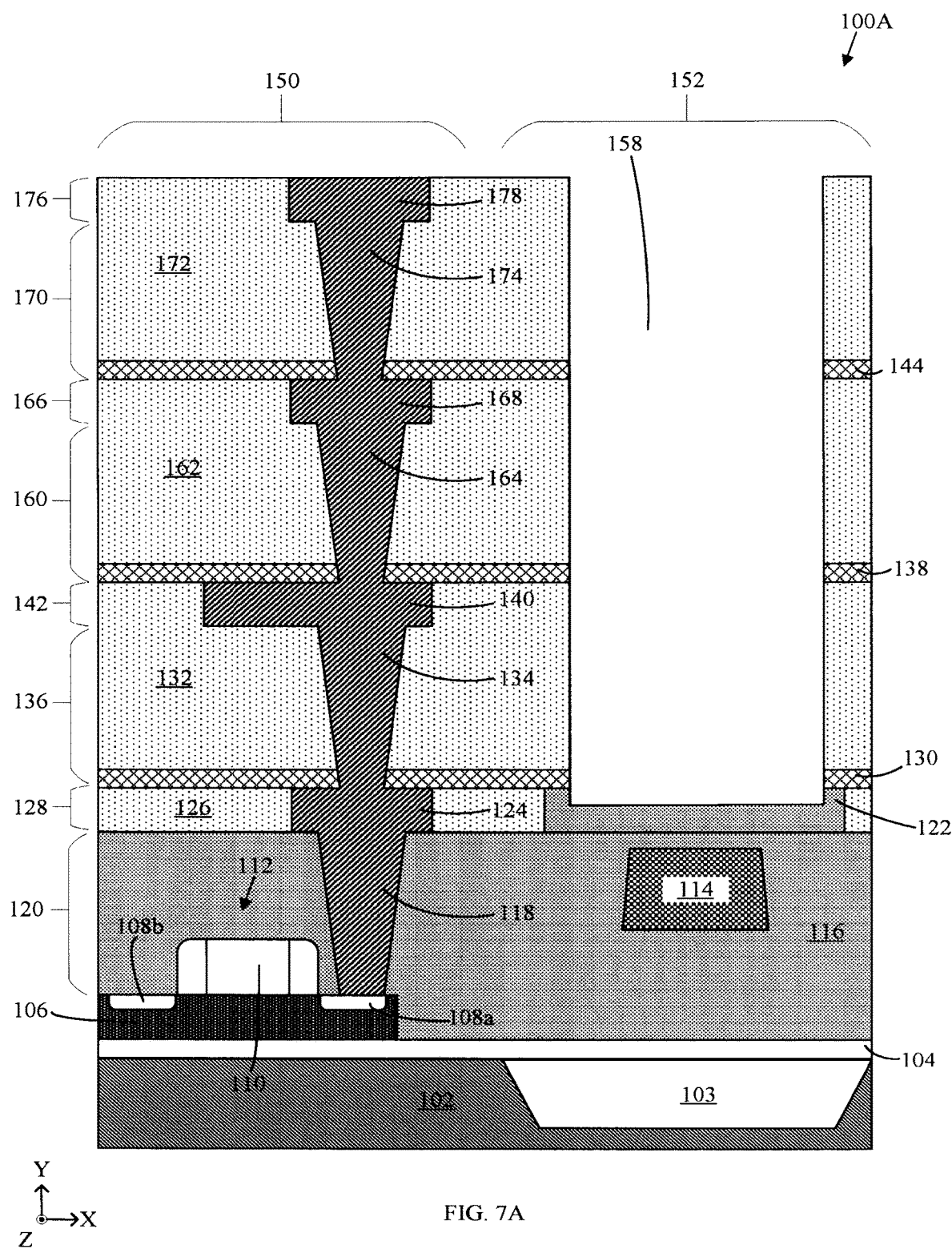
FIG. 7A and FIG. 7B are cross-sectional views depicting examples of the IC chip at processing stages subsequent to the example IC chip shown in FIG. 1.

FIG. 7A depicts an example structure of the IC chip 100A at a processing stage subsequent to FIG. 1. Referring to FIG. 7A, additional interlayer dielectric materials 162, 172 and dielectric liners 138, 144 are formed over the structure shown in FIG. 1. For example, dielectric liner 138 may be deposited on or directly on the interlayer dielectric material 132 and interlayer dielectric material 162 may be deposited on or directly on the dielectric liner 138. Interconnect via 164 and conductive line 168 may be formed in the interlayer dielectric material 162 using a damascene process. Dielectric liner 144 may be deposited on or directly on the interlayer dielectric material 162 and interlayer dielectric material 172 may be deposited on or directly on the dielectric liner 144. Interconnect via 174 and conductive line 178 may be formed in the interlayer dielectric material 172 using a damascene process. The structure may include connection levels 160, 166, 170, 176. Connection level 160 may be defined by the positioning of the interconnect via 134, connection level 166 may be defined by the positioning of the conductive line 168, connection level 170 may be defined by the positioning of the interconnect via 174, and connection level 176 may be defined by the positioning of the conductive line 178.

An etch process may be performed to form an opening 158 in the interlayer dielectric materials 132, 162, 172. The opening 158 may extend through the connection levels 136, 142, 160, 166, 170, 176 and the dielectric liners 130, 138, 144. The etch process may be stopped upon reaching the second cladding structure 122. In some instances, the etch process may over etch into the second cladding structure 122. The second cladding structure 122 may advantageously prevent over etching of the etchant into the optical component 114 by providing an additional layer of material for which the etching process can be stopped upon.

Figure 7B:
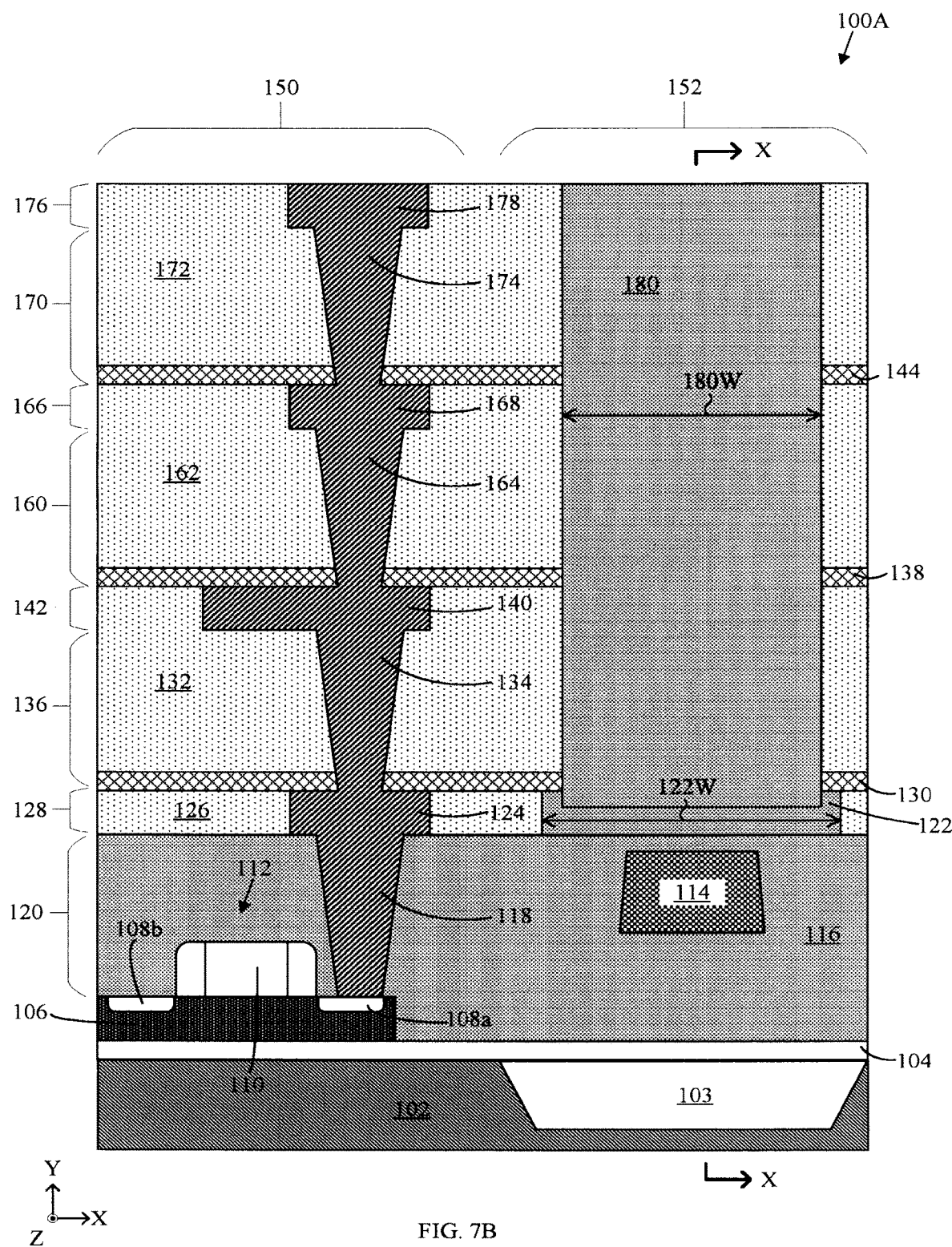

Referring to FIG. 7B, the opening 158 may be filled with a third cladding structure 180 using the deposition techniques described herein. The third cladding structure 180 may be formed on or directly on the second cladding structure 122. The third cladding structure 180 may extend through the connection levels 136, 142, 160, 166, 170, 176 and the dielectric liners 130, 138, 144. The third cladding structure 180 may be formed in the photonics region 152 and may not be present in the logic region 150. The third cladding structure 180 may have a width 180W and the second cladding structure 122 may have a width 122W. The width 180W of the third cladding structure 180 may be different from the width 122W of the second cladding structure 122. Preferably, the width 180W of the third cladding structure 180 may be smaller than the width 122W of the second cladding structure 122. The third cladding structure 180 may be laterally adjacent to and in direct contact with the interlayer dielectric materials 132, 162, 172 in the respective connection levels 136, 142, 160, 166, 170, 176. The third cladding structure 180 may include oxides of silicon, such as silicon oxide, tetraethyl orthosilicate (TEOS), undoped silicon glass (USG), high density plasma (HDP) silicon oxide, high aspect ratio process (HARP) oxide, tonen silazane (TOSZ) oxide, or flowable chemical vapor deposition (FCVD) oxide.

Figure 8:
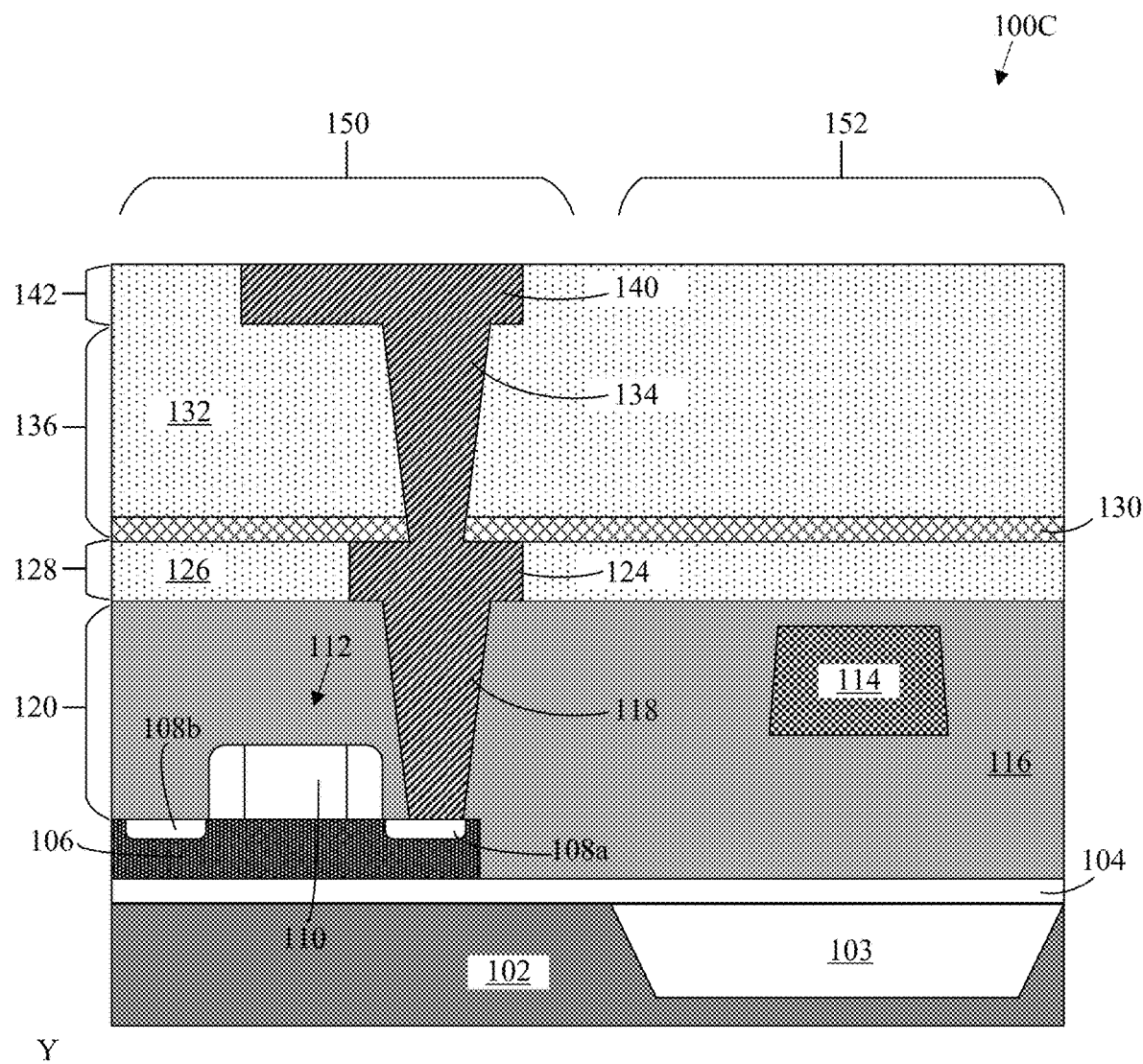
FIG. 8 through FIG. 10 are cross-sectional views depicting a set of steps for fabricating the exemplary IC chip shown in FIG. 3.
Figure 9:
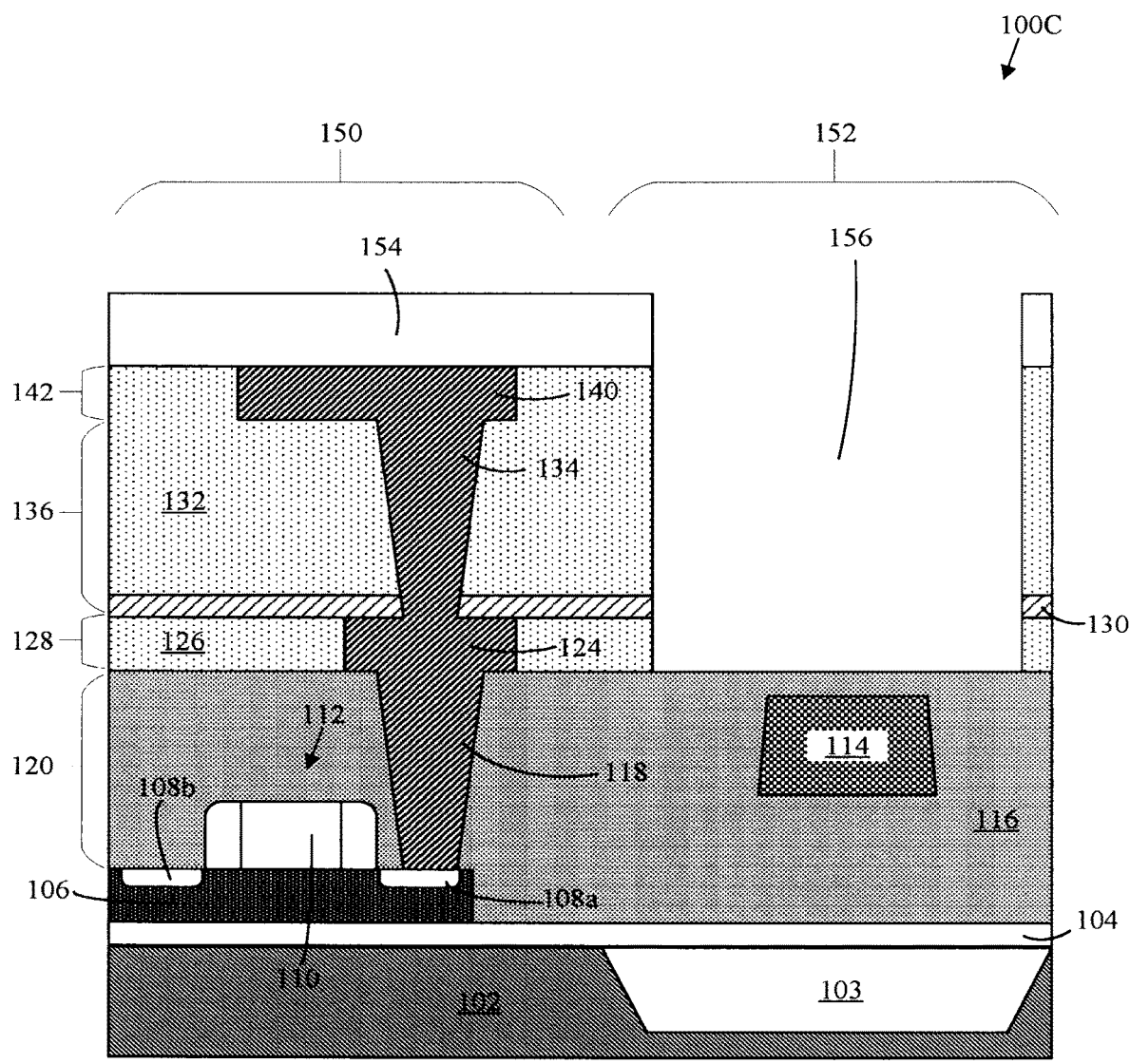
Figure 10:
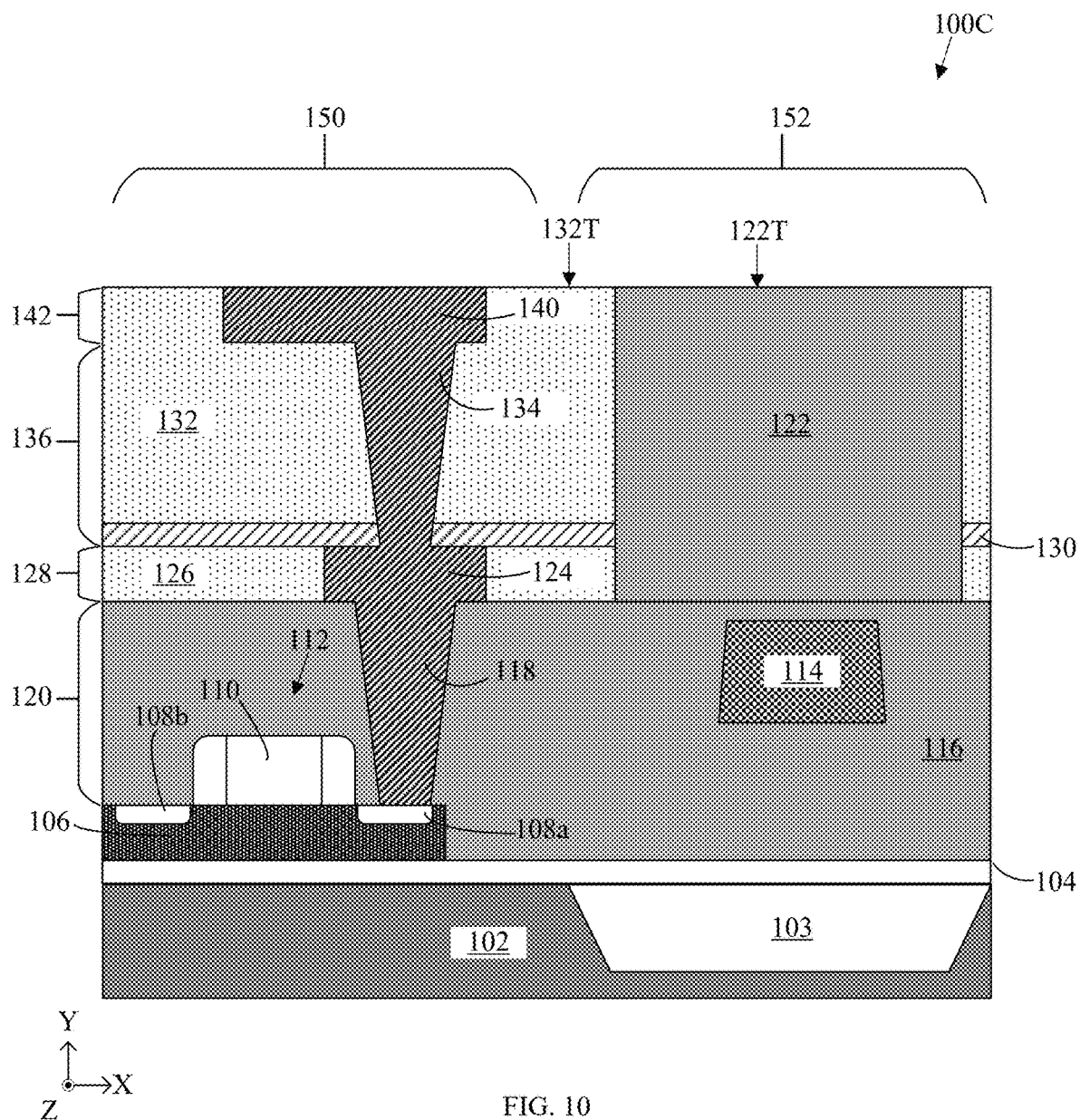

FIG. 8 through FIG. 10 illustrates a set of steps for fabricating the exemplary IC chip shown in FIG. 3. The structure in FIG. 8 may continue from the structure shown in FIG. 4. Referring to FIG. 8, a dielectric liner 130 may be deposited on or directly on the first interlayer dielectric material 126 and a second interlayer dielectric material 132 may be deposited on or directly on the dielectric liner 130. Interconnect via 134 and conductive line 140 may be formed in the second interlayer dielectric material 132 using a damascene process. The interconnect via 134 and the conductive line 140 may be formed in the logic region 150. For example, the second interlayer dielectric material 132 may be patterned using the patterning techniques described herein to form an opening (not shown), followed by depositing or sputtering of a metal in the opening to form the interconnect via 134 and the conductive line 140. The formation of the opening for which the metal is to be formed in may include an etch process. The dielectric liner 130 may serve as an etch stop layer during the etch process to prevent over etch into the underlying conductive line 124. The structure may further include a third connection level 136 and a fourth connection level 142. The third connection level 136 may be defined by the positioning of the interconnect via 134 and the fourth connection level 142 may be defined by the positioning of the conductive line 140. The third connection level 136 may be positioned on the second connection level 128 and the fourth connection level 142 may be positioned on the third connection level 136.

Referring to FIG. 9, a patterned mask layer 154 may be formed on the second interlayer dielectric material 132. The patterned mask layer 154 may mask sections of the second interlayer dielectric material 132 in the logic region 150 while sections of the second interlayer dielectric material 132 in the photonics region 152 may be unmasked or exposed. The unmasked or exposed sections of the second interlayer dielectric material 132 in the photonics region 152 may be patterned using the patterning techniques described herein. For example, the patterning process may include an etching step that etches through the second interlayer dielectric material 132, the dielectric liner 130, and the first interlayer dielectric material 126. An opening 156 may be formed in the first interlayer dielectric material 126 and the second interlayer dielectric material 132. The opening 156 may expose the first cladding structure 116. The opening 156 may be positioned in the photonics region 152. The patterned mask layer 154 may be removed after the patterning step.

Referring to FIG. 10, a second cladding structure 122 may be formed in the opening 156. The formation of the second cladding structure 122 may include the deposition of an oxide of silicon, followed by a chemical mechanical planarization of the deposited material. The deposited material may fill up the opening 156. The resulting second cladding structure 122 may have an upper surface 122T. The upper surface 122T of the second cladding structure 122 may be substantially coplanar with an upper surface of the second interlayer dielectric material 132T.

Figure 11A:
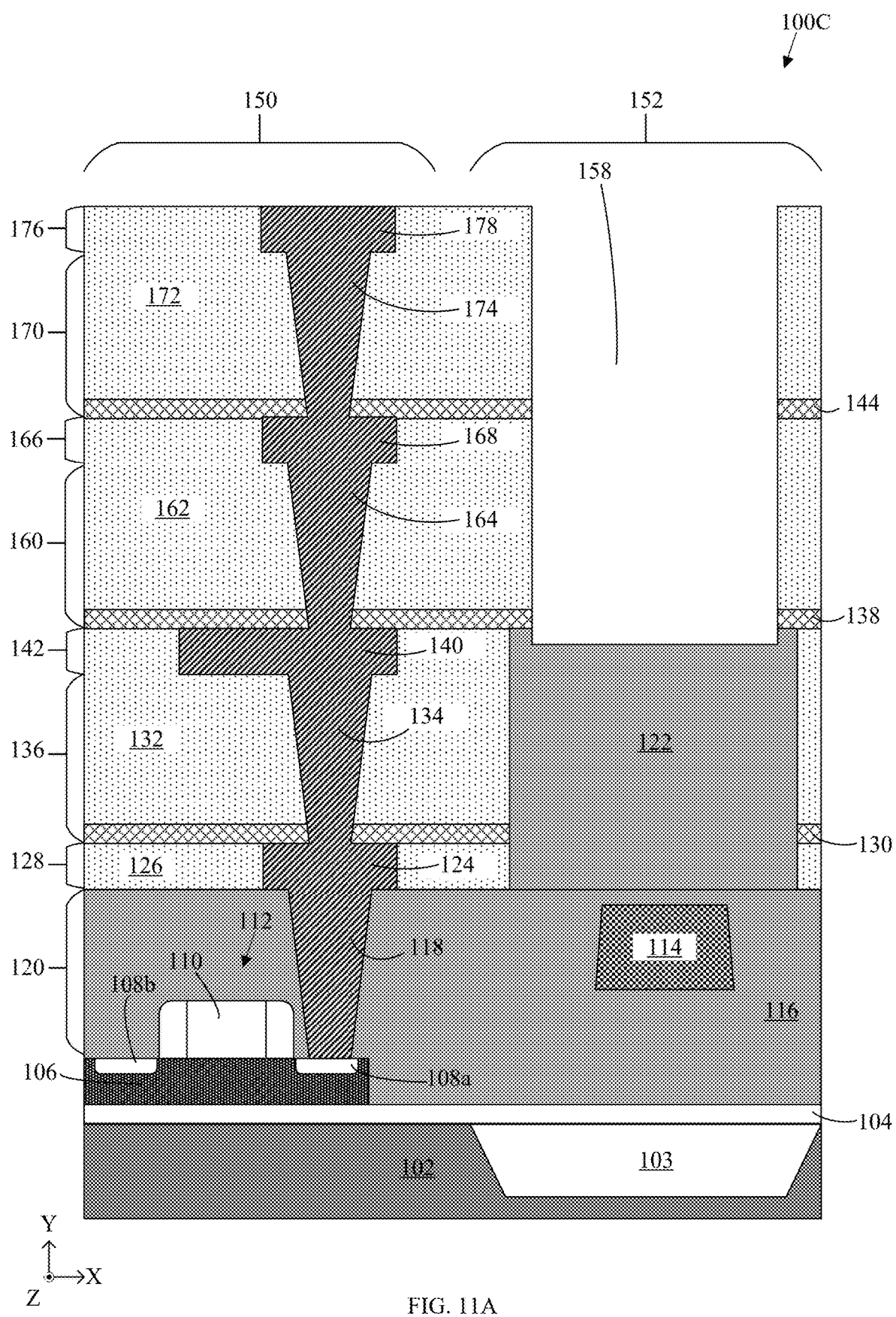
FIG. 11A and FIG. 11B are cross-sectional views depicting examples of the IC chip at processing stages subsequent to the example IC chip shown in FIG. 10.
Figure 11B:
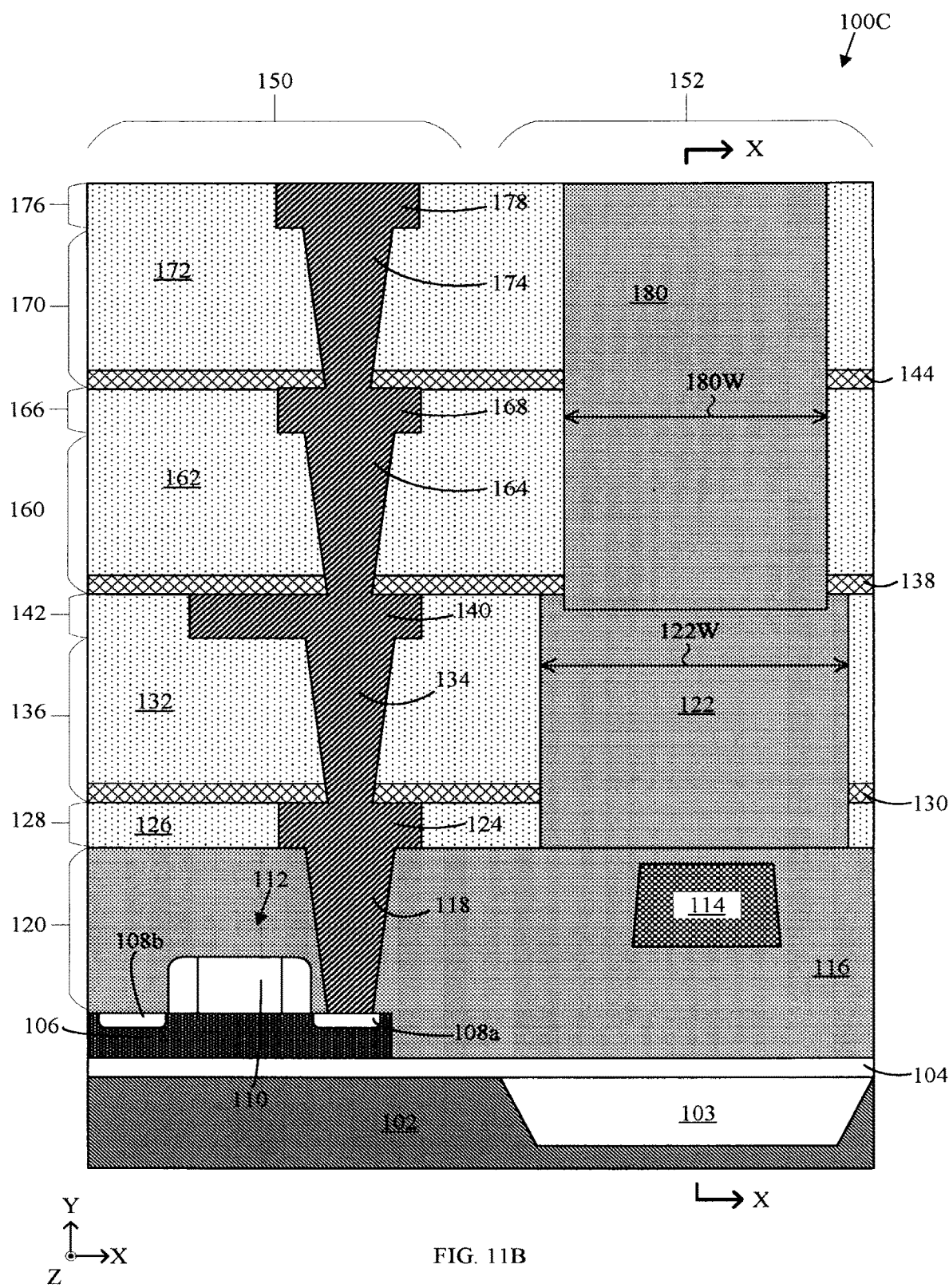

FIG. 11A and FIG. 11B depict example structures of the IC chip 100C at processing stages subsequent to FIG. 10. Referring to FIG. 11A, additional interlayer dielectric materials 162, 172 and dielectric liners 138, 144 are formed over the structure shown in FIG. 10. For example, dielectric liner 138 may be deposited on or directly on the interlayer dielectric material 132 and interlayer dielectric material 162 may be deposited on or directly on the dielectric liner 138. Interconnect via 164 and conductive line 168 may be formed in the interlayer dielectric material 162 using a damascene process. Dielectric liner 144 may be deposited on or directly on the interlayer dielectric material 162 and interlayer dielectric material 172 may be deposited on or directly on the dielectric liner 144. Interconnect via 174 and conductive line 178 may be formed in the interlayer dielectric material 172 using a damascene process. The structure may include connection levels 160, 166, 170, 176. Connection level 160 may be defined by the positioning of the interconnect via 134, connection level 166 may be defined by the positioning of the conductive line 168, connection level 170 may be defined by the positioning of the interconnect via 174, and connection level 176 may be defined by the positioning of the conductive line 178.

An etch process may be performed to form an opening 158 in the interlayer dielectric materials 132, 162, 172. The opening 158 may extend through the connection levels 136, 142, 160, 166, 170, 176 and the dielectric liners 130, 138, 144. The etch process may be stopped upon reaching the second cladding structure 122. In some instances, the etch process may over etch into the second cladding structure 122. The second cladding structure 122 may advantageously prevent over etching of the etchant into the optical component 114 by providing an additional layer of material for which the etching process can be stopped upon.

Referring to FIG. 11B, the opening 158 may be filled with a third cladding structure 180 using the deposition techniques described herein. The third cladding structure 180 may be formed on or directly on the second cladding structure 122. The third cladding structure 180 may extend through the connection levels 160, 166, 170, 176 and the dielectric liners 138, 144. The third cladding structure 180 may be formed in the photonics region 152 and may not be present in the logic region 150. The third cladding structure 180 may have a width 180W and the second cladding structure 122 may have a width 122W. The width 180W of the third cladding structure 180 may be different from the width 122W of the second cladding structure 122. Preferably, the width 180W of the third cladding structure 180 may be smaller than the width 122W of the second cladding structure 122. The third cladding structure 180 may be laterally adjacent to and in direct contact with the interlayer dielectric materials 162, 172 in the respective connection levels 160, 166, 170, 176. The third cladding structure 180 may include oxides of silicon, such as silicon oxide, tetraethyl orthosilicate (TEOS), undoped silicon glass (USG), high density plasma (HDP) silicon oxide, high aspect ratio process (HARP) oxide, tonen silazane (TOSZ) oxide, or flowable chemical vapor deposition (FCVD) oxide.

Figure 12:
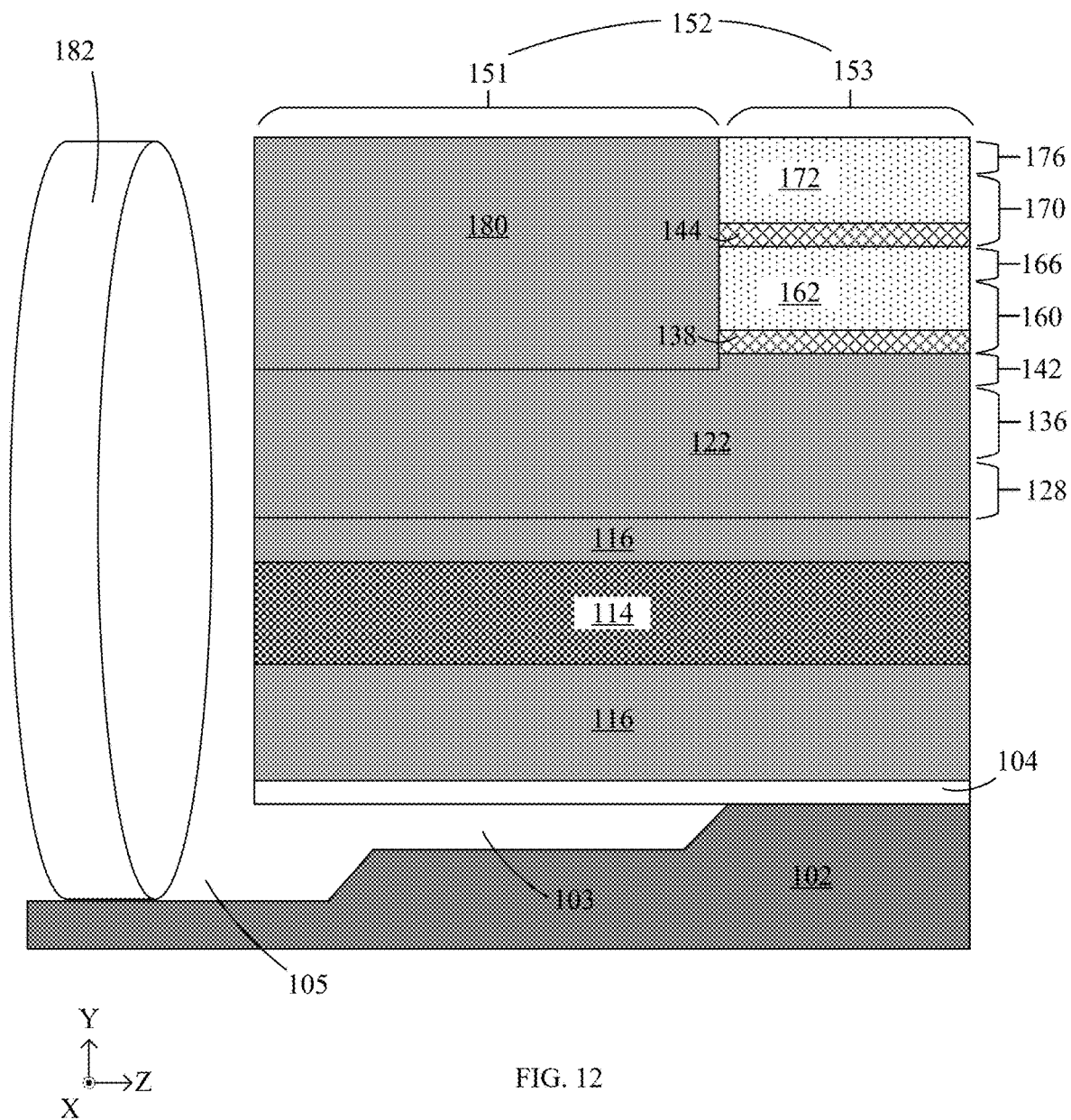
FIG. 12 is a cross-sectional view, taken along a section line XX, of the example IC chip shown in FIG. 11B.

FIG. 12 is a cross-sectional view of the example IC chip 100C shown in FIG. 11B. The view in FIG. 12 is taken from the section line XX shown in FIG. 11B and depicts the cross-section along a longitudinal axis of the optical component 114 in FIG. 11B. Referring to FIG. 12, the optical component 114 may be a waveguide. An optical fiber 182 may be positioned adjacent to an edge of the IC chip and may be in lateral alignment with the waveguide 114. A groove 105 may be defined on the substrate 102. The optical fiber 182 may be placed in the groove 105. The photonics region 152 may include an edge coupler section 151 and a waveguide section 153, in which the edge coupler section 151 adjoins the waveguide section 153. In embodiments where the substrate 102 includes a cavity 103 defined therein, the edge coupler section 151 may be aligned vertically above the cavity 103 while the waveguide section 153 may not be aligned vertically above the cavity 103 and may be laterally displaced from the cavity 103.

The edge coupler section 151 may be proximal to the edge of the IC chip while the waveguide section 153 may be distal to the edge of the IC chip. For example, the edge coupler section 151 may be directly adjacent to the optical fiber 182 such that the edge coupler section 151 may be laterally between the optical fiber 182 and the waveguide section 153. The third cladding structure 180 may be positioned in the edge coupler section 151 and may not be present in the waveguide section 153. The third cladding structure 180 may be directly adjacent to the optical fiber 182. The second cladding structure 122, the first cladding structure 116, and the waveguide 114 may extend laterally across the edge coupler section 151 and the waveguide section 153. In the waveguide section 153, the connection levels 160, 166, 170, 176 and the dielectric liners 138, 144 may be formed above the second cladding structure 122. The connection levels 160, 166 may include the interlayer dielectric material 162 and the connection levels 170, 176 may include the interlayer dielectric material 172. The third cladding structure 180 may be laterally adjacent to and in direct contact with the interlayer dielectric material 162, 172.

Figure 13A:
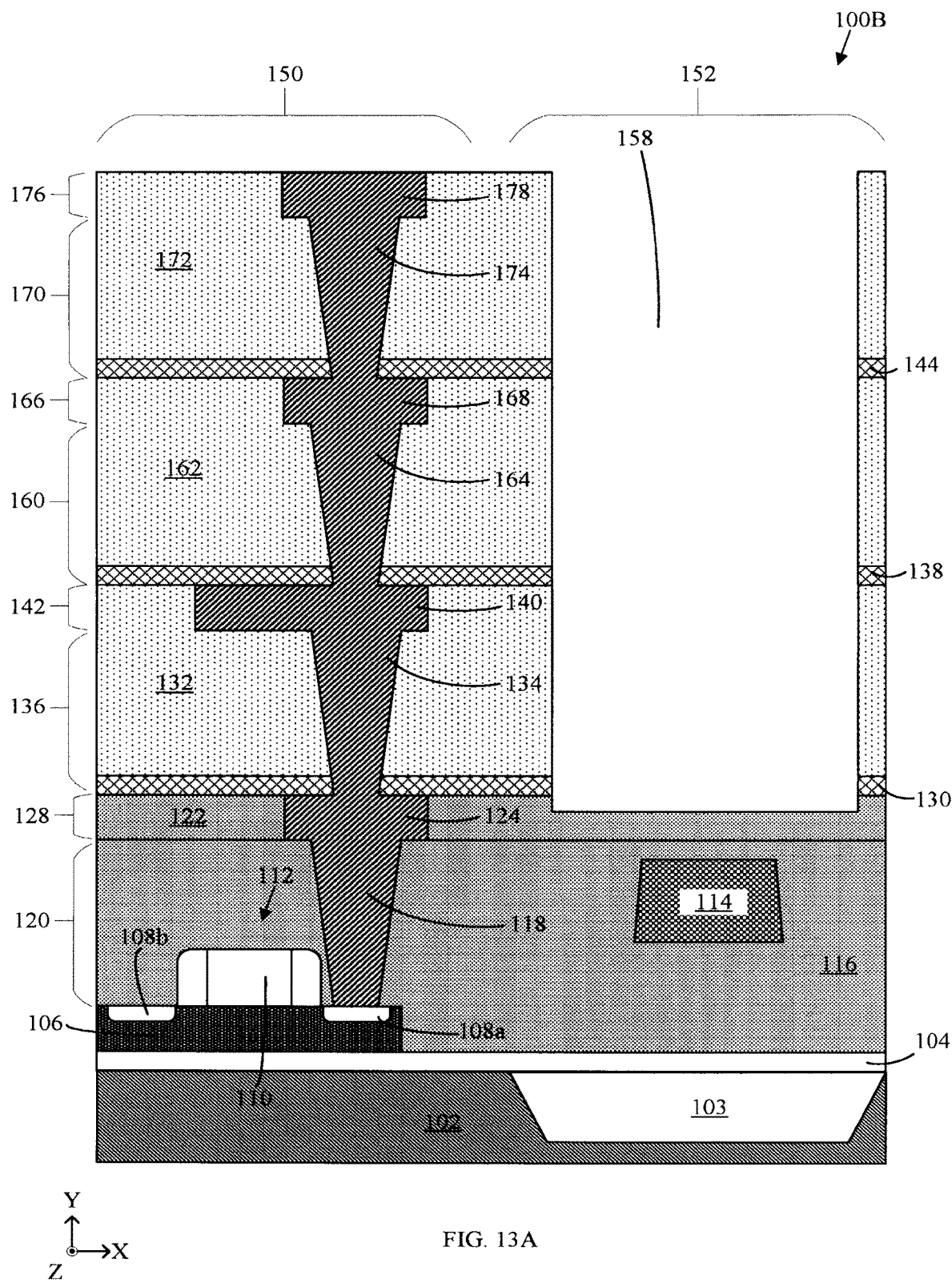
FIG. 13A and FIG. 13B are cross-sectional views depicting examples of the IC chip at processing stages subsequent to the example IC chip shown in FIG. 2.
Figure 13B:
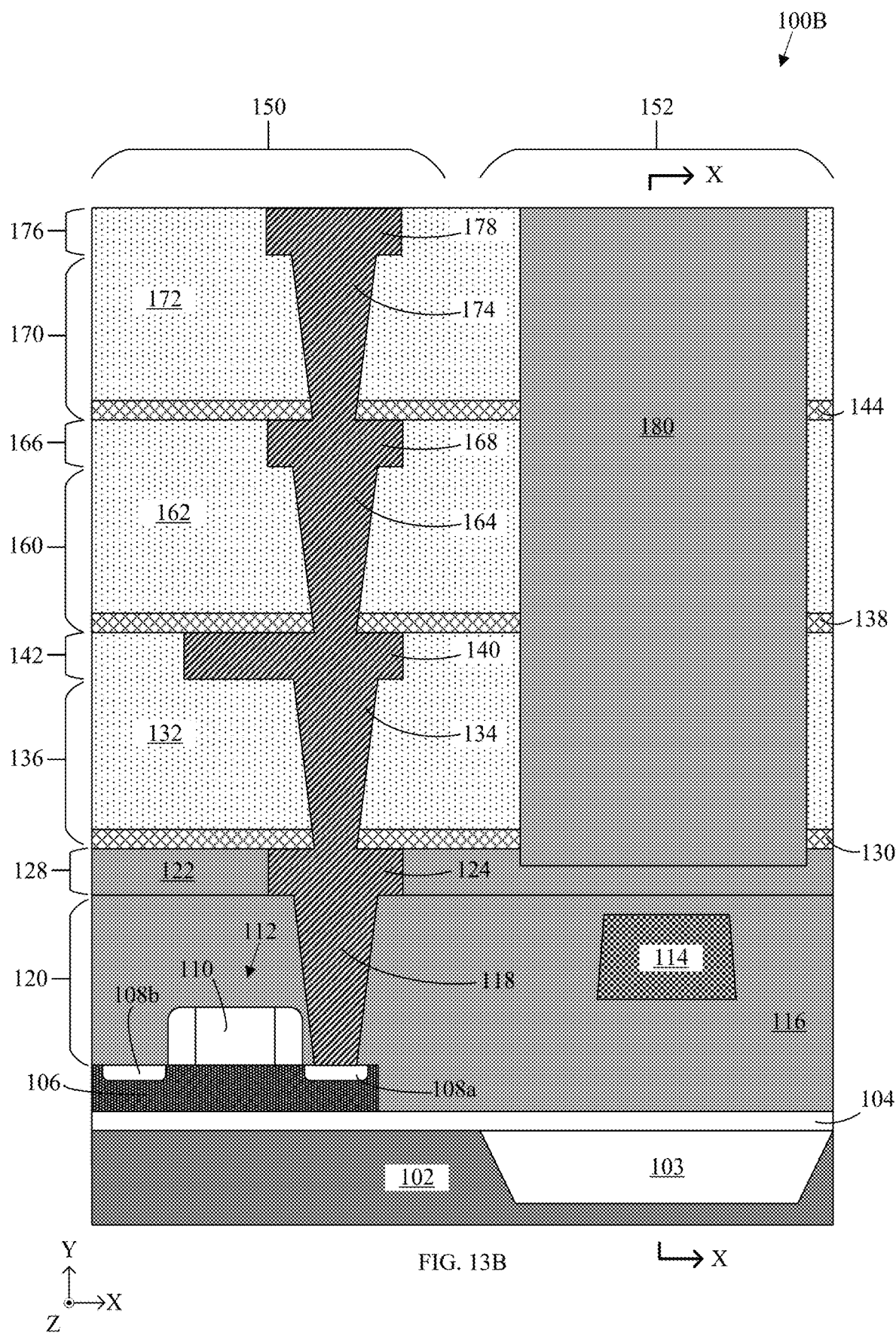

FIG. 13A and FIG. 13B depict structures at processing stages subsequent to FIG. 2. Referring to FIG. 13A, additional interlayer dielectric materials 162, 172 and dielectric liners 138, 144 are formed over the structure shown in FIG. 2. For example, dielectric liner 138 may be deposited on or directly on the interlayer dielectric material 132 and interlayer dielectric material 162 may be deposited on or directly on the dielectric liner 138. Interconnect via 164 and conductive line 168 may be formed in the interlayer dielectric material 162 using a damascene process. Dielectric liner 144 may be deposited on or directly on the interlayer dielectric material 162 and interlayer dielectric material 172 may be deposited on or directly on the dielectric liner 144. Interconnect via 174 and conductive line 178 may be formed in the interlayer dielectric material 172 using a damascene process. The structure may include connection levels 160, 166, 170, 176. Connection level 160 may be defined by the positioning of the interconnect via 134, connection level 166 may be defined by the positioning of the conductive line 168, connection level 170 may be defined by the positioning of the interconnect via 174, and connection level 176 may be defined by the positioning of the conductive line 178.

An etch process may be performed to form an opening 158 in the interlayer dielectric materials 132, 162, 172. The opening 158 may extend through the connection levels 136, 142, 160, 166, 170, 176 and the dielectric liners 130, 138, 144. The etch process may be stopped upon reaching the second cladding structure 122. In some instances, the etch process may over etch into the second cladding structure 122. The second cladding structure 122 may advantageously prevent over etching of the etchant into the optical component 114 by providing an additional layer of material for which the etching process can be stopped upon.

Referring to FIG. 13B, the opening 158 may be filled with a third cladding structure 180 using the deposition techniques described herein. The third cladding structure 180 may be formed on or directly on the second cladding structure 122. The third cladding structure 180 may extend through the connection levels 136, 142, 160, 166, 170, 176 and the dielectric liners 130, 138, 144. The third cladding structure 180 may be formed in the photonics region 152 and may not be present in the logic region 150. The third cladding structure 180 may be laterally adjacent to and in direct contact with the interlayer dielectric materials 132, 162, 172 in the respective connection levels 136, 142, 160, 166, 170, 176. The third cladding structure 180 may include oxides of silicon, such as silicon oxide, tetraethyl orthosilicate (TEOS), undoped silicon glass (USG), high density plasma (HDP) silicon oxide, high aspect ratio process (HARP) oxide, tonen silazane (TOSZ) oxide, or flowable chemical vapor deposition (FCVD) oxide.

Figure 14:
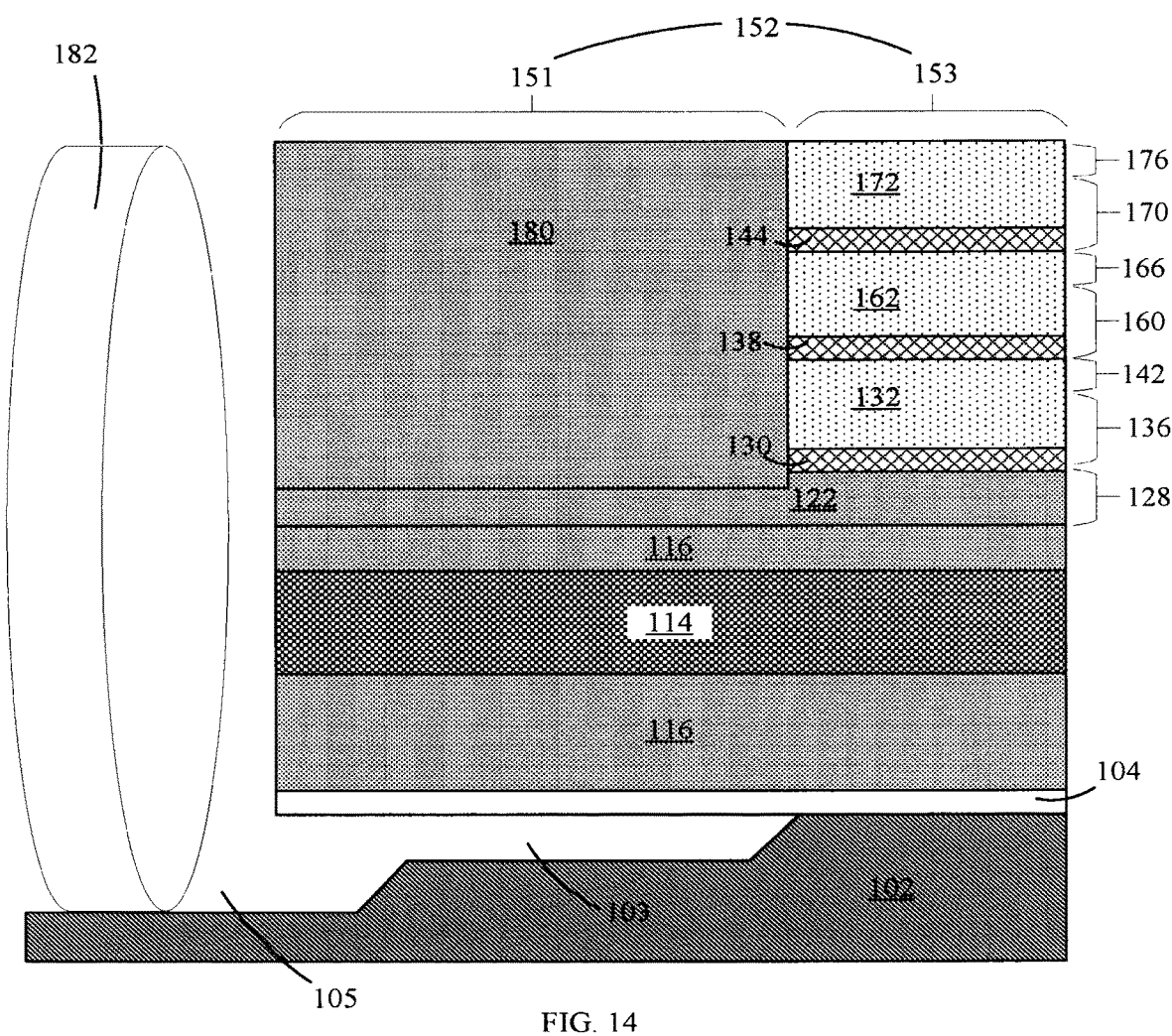
FIG. 14 is a cross-sectional view, taken along a section line XX, of the example IC chip shown in either FIG. 7B or FIG. 13B.

FIG. 14 is a cross-sectional view of the example IC chips 100A, 100B shown in FIG. 7B and FIG. 13B. The view in FIG. 14 is taken from the section line XX shown in FIG. 7B and FIG. 13B, and depicts the cross-section along a longitudinal axis of the optical component 114 in FIG. 7B and FIG. 13B. Referring to FIG. 14, the optical component 114 may be a waveguide. An optical fiber 182 may be positioned adjacent to an edge of the IC chip and may be in lateral alignment with the waveguide 114. A groove 105 may be defined on the substrate 102. The optical fiber 182 may be placed in the groove 105. The photonics region 152 may include an edge coupler section 151 and a waveguide section 153, in which the edge coupler section 151 adjoins the waveguide section 153. In embodiments where the substrate 102 includes a cavity 103 defined therein, the edge coupler section 151 may be aligned vertically above the cavity 103 while the waveguide section 153 may not be aligned vertically above the cavity 103 and may be laterally displaced from the cavity 103.

The edge coupler section 151 may be proximal to the edge of the IC chip while the waveguide section 153 may be distal to the edge of the IC chip. For example, the edge coupler section 151 may be directly adjacent to the optical fiber 182 such that the edge coupler section 151 may be laterally between the optical fiber 182 and the waveguide section 153. The third cladding structure 180 may be positioned in the edge coupler section 151 and may not be present in the waveguide section 153. The third cladding structure 180 may be directly adjacent to the optical fiber 182. The second cladding structure 122, the first cladding structure 116, and the waveguide 114 may extend laterally across the edge coupler section 151 and the waveguide section 153. In the waveguide section 153, the connection levels 136, 142, 160, 166, 170, 176 and the dielectric liners 138, 144 may be formed above the second cladding structure 122. The connection levels 136, 142 may include the interlayer dielectric material 132, the connection levels 160, 166 may include the interlayer dielectric material 162, and the connection levels 170, 176 may include the interlayer dielectric material 172. The third cladding structure 180 may be laterally adjacent to and in direct contact with the interlayer dielectric material 132, 162, 172.

Throughout this disclosure, it is to be understood that if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of elements is not necessarily limited to those elements, but may include other elements not expressly listed or inherent to such process, method, article, or device. Occurrences of the phrase "in an embodiment" herein do not necessarily all refer to the same embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Furthermore, there is no intention to be bound by any theory presented in the preceding background or the following detailed description. Additionally, the various tasks and processes described herein may be incorporated into a more comprehensive procedure or process having additional functionality not described in detail herein.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

As will be readily apparent to those skilled in the art upon a complete reading of the present application, the disclosed semiconductor chips, products, and methods of forming the same may be employed in manufacturing a variety of different integrated circuit products and packaging modules, including, but not limited to, photonics modules, optical communication systems, etc.

What is claimed is:

1. An integrated circuit (IC) chip comprising:
   a substrate;
   an optical component above the substrate;
   an active layer above the substrate;
   a transistor on the active layer, the transistor includes a source or drain region;
   a contact structure on the source or drain region;
   a first connection level above the substrate, the first connection level includes the optical component, the transistor, the contact structure, and a first cladding structure, wherein the optical component is covered by the first cladding structure;
   a second connection level on the first connection level, the second connection level includes a conductive line, the conductive line is disposed directly on the contact structure in the first connection level;
   a third connection level on the second connection level;
   a fourth connection level on the third connection level, the third connection level and the fourth connection level include an interlayer dielectric material;
   a second cladding structure directly above the optical component, the second cladding structure having at least a section within the second connection level, the second cladding structure is directly on the first cladding structure, wherein the second cladding structure includes a material different from the interlayer dielectric material in the third and the fourth connection levels;
   a photonics region above the substrate, the photonics region includes an edge coupler section and a waveguide section, wherein the optical component is positioned in the photonics region;
   a third cladding structure on the second cladding structure, the third cladding structure is positioned in the photonics region, wherein the third cladding structure is positioned within the edge coupler section and not present in the waveguide section, and the second cladding structure extends laterally across the edge coupler section and the waveguide section; and
   a logic region above the substrate, wherein the transistor, the contact structure, and the conductive line are positioned in the logic region.

2. The IC chip of claim 1, wherein the second cladding structure is within the second connection level.

3. The IC chip of claim 2, wherein the second cladding structure is positioned within the photonics region.

4. The IC chip of claim 1, wherein the second cladding structure has a lower section in the second connection level, a middle section in the third connection level, and an upper section in the fourth connection level, and wherein the second cladding structure is positioned within the photonics region.

5. The IC chip of claim 4, wherein the second connection level includes an interlayer dielectric material, and wherein the second cladding structure includes a material different from the interlayer dielectric material in the second connection level.

6. The IC chip of claim 5, wherein the interlayer dielectric material in the second connection level is laterally adjacent to and in direct contact with the lower section of the second cladding structure, and wherein the interlayer dielectric material in the third and the fourth connection levels is laterally adjacent to and in direct contact with the middle section and the upper section of the second cladding structure.

7. The IC chip of claim 1, wherein the third cladding structure has a width, the second cladding structure has a width, and the width of the third cladding structure is different from the width of the second cladding structure, and the second cladding structure is vertically between the first cladding structure and the third cladding structure.

8. The IC chip of claim 7, further comprising an optical fiber directly adjacent to the edge coupler section and the third cladding structure, wherein the optical component is a waveguide and the optical fiber is in lateral alignment with the waveguide.

9. The IC chip of claim 7, wherein the substrate includes a cavity, the cavity is positioned within the photonics region, and the edge coupler section is aligned vertically above the cavity.

10. The IC chip of claim 1, wherein the transistor includes a gate in the first connection level, and the optical component is positioned above the gate.

11. The IC chip of claim 1, wherein the first cladding structure extends from the photonics region to the logic region, the first cladding structure is positioned over the transistor, and the contact structure is in the first cladding structure.

12. An IC chip comprising:
    a substrate;
    an active layer above the substrate;
    a transistor on the active layer, the transistor includes a source or drain region;
    a contact structure on the source or drain region;
    an optical component above the substrate;
    a first connection level above the substrate, the first connection level includes the optical component, the transistor, the contact structure, and a first cladding structure, wherein the optical component is covered by the first cladding structure;
    a second connection level on the first connection level, the second connection level includes a first interlayer dielectric material level, and a conductive line, wherein the conductive line in the second connection level is disposed directly on the contact structure in the first connection level;
    a second cladding structure directly above the optical component, the second cladding structure having at least a section within the second connection level, the second cladding structure is directly on the first cladding structure, the second cladding structure is laterally adjacent to and in direct contact with the first interlayer dielectric material, wherein the second cladding structure includes a material different from the first interlayer dielectric material;
    a photonics region above the substrate, the photonics region includes an edge coupler section and a waveguide section, wherein the optical component is positioned in the photonics region;
    a third cladding structure on the second cladding structure, the third cladding structure is positioned in the photonics region, wherein the third cladding structure is positioned within the edge coupler section and not present in the waveguide section, and the second cladding structure extends laterally across the edge coupler section and the waveguide section; and a logic region above the substrate, wherein the transistor, the contact structure, and the conductive line are positioned in the logic region.

13. The IC chip of claim 12, wherein the third cladding structure has a width, the second cladding structure has a width, and the width of the third cladding structure is smaller than the width of the second cladding structure.

14. The IC chip of claim 13, further comprising:
a third connection level on the second connection level; and
a fourth connection level on the third connection level, wherein the second cladding structure extends through the third connection level and terminates in the fourth connection level.

15. The IC chip of claim 14, wherein the second cladding structure has a first section in the second connection level, a second section in the third connection level, and a third section in the fourth connection level.

16. The IC chip of claim 14, further comprising a second interlayer dielectric material in the third connection level and the fourth connection level, the second interlayer dielectric material is laterally adjacent to and in direct contact with the second cladding structure, wherein the second cladding structure includes a material different from the second interlayer dielectric material.

17. The IC chip of claim 13, wherein the second cladding structure is within the second connection level.

* * * * *